United States Patent
Shen et al.

(10) Patent No.: US 12,512,897 B2
(45) Date of Patent: Dec. 30, 2025

(54) ANTENNA SWITCHING METHOD AND TERMINAL DEVICE

(71) Applicant: Honor Device Co., Ltd., Shenzhen (CN)

(72) Inventors: Li Shen, Shenzhen (CN); Jiangwei Shi, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 77 days.

(21) Appl. No.: 18/700,036

(22) PCT Filed: Mar. 15, 2023

(86) PCT No.: PCT/CN2023/081722
§ 371 (c)(1),
(2) Date: Apr. 10, 2024

(87) PCT Pub. No.: WO2023/179432
PCT Pub. Date: Sep. 28, 2023

(65) Prior Publication Data
US 2024/0340069 A1    Oct. 10, 2024

(30) Foreign Application Priority Data

Mar. 24, 2022 (CN) .......................... 202210297292.4
May 16, 2022 (CN) .......................... 202210530373.4

(51) Int. Cl.
*H04B 7/08* (2006.01)
*H04B 7/0456* (2017.01)
*H04W 52/02* (2009.01)

(52) U.S. Cl.
CPC ......... *H04B 7/0814* (2013.01); *H04B 7/0456* (2013.01); *H04W 52/02* (2013.01)

(58) Field of Classification Search
CPC .... H04B 7/0617; H04B 7/088; H04B 7/0695; H04B 7/0408; H04B 7/06952;
(Continued)

(56) References Cited

U.S. PATENT DOCUMENTS 9,807,777 B2 *  10/2017  Kim ..................... H04L 5/0023
2013/0308608 A1 * 11/2013  Hu ....................... H04W 72/542
                                                              370/334
(Continued)

FOREIGN PATENT DOCUMENTS

CN    104753579  A    7/2015
CN    106817748  A    6/2017
(Continued)

*Primary Examiner* — Eva Y Puente
(74) *Attorney, Agent, or Firm* — Conley Rose, P.C.

(57) ABSTRACT

An antenna switching method. When a terminal device is in an idle state, a first target parameter is determined according to signal quality parameters corresponding to downlink signals received by a first quantity of antennas in the terminal device, and some antennas with better signal quality are selected from the first quantity of antennas as first target antennas if the first target parameter is greater than or equal to a first preset threshold, to continue to receive, through the first target antennas, downlink signals from a network device. Therefore, signal quality of the downlink signals received by the first target antennas can be better, thereby improving signal quality of the downlink signals finally received by the terminal device, to improve receiving performance of the terminal device.

20 Claims, 7 Drawing Sheets

(58) Field of Classification Search
CPC .............. H04B 7/06956; H04B 7/0413; H04B 7/0626; H04W 16/28; H04W 72/046; H04W 72/23; H04W 24/10; H04W 24/08; H04W 72/0446; H04W 74/0833; H04W 88/08; H04L 5/0048; H04L 5/0023; H04L 5/0053; H04L 5/0094; H04L 5/0091; H04L 5/0007; H04L 5/0051; H04L 5/14; H04L 1/08

See application file for complete search history.

(56) References Cited

U.S. PATENT DOCUMENTS

| | | | |
|---|---|---|---|
| 2019/0208569 | A1 | 7/2019 | Lee et al. |
| 2023/0300775 | A1* | 9/2023 | Luong .................. H04W 64/00 455/456.1 |
| 2023/0327721 | A1 | 10/2023 | Huang et al. |
| 2025/0253075 | A1* | 8/2025 | Hsiao ..................... H01C 1/142 |

FOREIGN PATENT DOCUMENTS

| | | | |
|---|---|---|---|
| CN | 107465446 | A | 12/2017 |
| CN | 110768705 | A | 2/2020 |
| CN | 107465446 | B | 7/2020 |
| CN | 112583504 | A | 3/2021 |
| CN | 112970207 | A | 6/2021 |
| CN | 114095104 | A | 2/2022 |
| EP | 0318665 | A2 | 6/1989 |

* cited by examiner

ANTENNA SWITCHING METHOD AND TERMINAL DEVICE

CROSS-REFERENCE TO RELATED APPLICATIONS

This is a U.S. National Stage of International Application No. PCT/CN2023/081722 filed on Mar. 15, 2023, which claims priority to Chinese Patent Application No. 202210297292.4, filed with the China National Intellectual Property Administration on Mar. 24, 2022, and to Chinese Patent Application No. 202210530373.4, filed with the China National Intellectual Property Administration on May 16, 2022, all of which are incorporated herein by reference in their entireties.

TECHNICAL FIELD

This application relates to the field of communication technologies, and in particular, to an antenna switching method and a terminal device.

BACKGROUND

With continuous development of wireless communication technologies, a terminal device needs to bear an increasing quantity of services, so that the terminal device requires a stronger communication capability to improve communication quality. Therefore, the terminal device gradually evolves from a single antenna to a plurality of antennas.

Currently, when the terminal device is in an idle state, to reduce power consumption of the terminal device, a receiving channel corresponding to a main antenna is connected, and a receiving channel corresponding to a diversity antenna is disconnected, so that the terminal device uses the main antenna to receive a downlink signal sent by a network device.

However, in some scenarios, signal quality of the downlink signal received by the main antenna is poor. As a result, receiving performance of the terminal device is affected.

SUMMARY

Embodiments of this application provide an antenna switching method and a terminal device. When a terminal device is in an idle state, signal quality of a downlink signal received by the terminal device is improved while reducing power consumption of the terminal device, to improve receiving performance of the terminal device.

According to a first aspect, an embodiment of this application provides an antenna switching method, applied to a terminal device, where the terminal device includes a first quantity of antennas, the first quantity is a positive integer greater than 1, the terminal device is in an idle state, and the method includes: determining a first target parameter according to signal quality parameters corresponding to downlink signals received by the first quantity of antennas; and selecting some antennas from the first quantity of antennas as first target antennas if the first target parameter is greater than or equal to a first preset threshold, where the first target antennas are configured to continue to receive downlink signals sent by a network device; and signal quality parameters of the downlink signals received by the first target antennas are greater than signal quality parameters of downlink signals received by other antennas different from the first target antennas in the first quantity of antennas.

The first quantity may be N. In this way, when the terminal device is in the idle state, some antennas with better signal quality are selected from the N antennas as the first target antennas, so that signal quality of the downlink signals received by the first target antennas is better, thereby improving signal quality of the downlink signals finally received by the terminal device, to improve receiving performance of the terminal device. In addition, because some antennas of the N antennas are used as the first target antennas, to continue to receive the downlink signals sent by the network device, power consumption of the terminal device can be reduced.

In an optional implementation, the determining a first target parameter according to signal quality parameters corresponding to downlink signals received by the first quantity of antennas includes: using a first feature value of the signal quality parameters corresponding to the downlink signals received by the first quantity of antennas as the first target parameter, where the first feature value is a weighted average value or a maximum value of the signal quality parameters corresponding to the first quantity of antennas. In this way, the weighted average value or the maximum value of the signal quality parameters corresponding to the downlink signals received by the N antennas is directly used as the first target parameter, so that a calculation manner of the first target parameter is simpler.

In an optional implementation, the selecting some antennas from the first quantity of antennas as first target antennas if the first target parameter is greater than or equal to a first preset threshold includes: comparing the first target parameter with a second preset threshold if the first target parameter is greater than or equal to the first preset threshold, where the first preset threshold is less than the second preset threshold; and selecting a second quantity of antennas from the first quantity of antennas as first target antennas if the first target parameter is less than the second preset threshold and greater than or equal to the first preset threshold; or selecting a third quantity of antennas from the first quantity of antennas as first target antennas if the first target parameter is greater than or equal to the second preset threshold, where the second quantity and the third quantity are both positive integers less than the first quantity, and the second quantity is greater than the third quantity. The second quantity may be K, and the third quantity may be R. In this way, different quantities of antennas are set as the first target antennas according to relationships between the first target parameter and different preset thresholds, so that the terminal device can achieve a balance between the receiving performance and the power consumption.

In an optional implementation, after the determining a first target parameter according to signal quality parameters corresponding to downlink signals received by the first quantity of antennas, the method further includes: using all the first quantity of antennas as first target antennas if the first target parameter is less than the first preset threshold. In this way, when the signal quality of the downlink signals received by the N antennas is not good, the N antennas continue to receive the downlink signals sent by the network device, to improve receiving performance of the terminal device.

In an optional implementation, before the determining a first target parameter according to signal quality parameters corresponding to downlink signals received by the first quantity of antennas, the method further includes: receiving, through a fourth quantity of second target antennas connected in the idle state, the downlink signals sent by the network device, where the fourth quantity is a positive integer less than the first quantity; determining a second target parameter according to signal quality parameters corresponding to the downlink signals received by the fourth quantity of second target antennas; and controlling, if the second target parameter is less than or equal to a third preset threshold, the first quantity of antennas to receive the downlink signals sent by the network device, where the third preset threshold is greater than the first preset threshold. The fourth quantity may be M. In this way, in a scenario in which the terminal device camps on a network and enters the idle state, when the signal quality of the downlink signals received by the second target antennas is not good, the downlink signals are received through the N antennas, thereby conveniently selecting the first target antennas with better signal quality from the N antennas. In addition, by setting the third preset threshold to be greater than the first preset threshold, a ping-pong effect during antenna switching can be suppressed.

In an optional implementation, the determining a second target parameter according to signal quality parameters corresponding to the downlink signals received by the fourth quantity of second target antennas includes: using a second feature value of the signal quality parameters corresponding to the downlink signals received by the fourth quantity of second target antennas as the second target parameter, where the second feature value is a weighted average value or a maximum value of the signal quality parameters corresponding to the fourth quantity of second target antennas. In this way, the weighted average value or the maximum value of the signal quality parameters corresponding to the downlink signals received by the M second target antennas is directly used as the second target parameter, so that a calculation manner of the second target parameter is simpler.

In an optional implementation, before the determining a first target parameter according to signal quality parameters corresponding to downlink signals received by the first quantity of antennas, the method further includes: receiving, through a fourth quantity of second target antennas connected in the idle state, the downlink signals sent by the network device, where the fourth quantity is a positive integer less than the first quantity; controlling, if the downlink signals received by the fourth quantity of second target antennas are demodulated unsuccessfully, the first quantity of antennas to receive the downlink signals sent by the network device. In this way, in a scenario in which the terminal device camps on a network and enters the idle state, when the signal quality of the downlink signals received by the second target antennas is not good to cause unsuccessful demodulation, the downlink signals are received through the N antennas, thereby conveniently selecting the first target antennas with better signal quality from the N antennas.

In an optional implementation, before the determining a first target parameter according to signal quality parameters corresponding to downlink signals received by the first quantity of antennas, the method further includes: switching, by the terminal device, from the idle state to a connected state; receiving, in the connected state through the first quantity of antennas, the downlink signals sent by the network device; and switching, by the terminal device, from the connected state to the idle state. In this way, when the terminal device is in the connected state, the N antennas in the terminal device have received the downlink signals sent by the network device. Therefore, when switching from the connected state to the idle state, the terminal device may not need to again control the N antennas to receive the downlink signals sent by the network device, but directly selects the first target antennas with better signal quality from the antennas according to the downlink signals received by the N antennas in the connected state, thereby simplifying an execution process of the terminal device.

In an optional implementation, after the selecting some antennas from the first quantity of antennas as first target antennas, the method further includes: monitoring a motion state of the terminal device, where the motion state includes a motionless state or a moving state; and still continuing to receive, through the first target antennas when the motion state is the motionless state, the downlink signals sent by the network device. In this way, when being in the motionless state, the terminal device may directly use the previously selected first target antennas to continue to receive the downlink signals, thereby reducing power consumption caused by continuously switching the target antennas for receiving the downlink signals.

In an optional implementation, after the monitoring a motion state of the terminal device, the method further includes: monitoring a moving parameter corresponding to the moving state when the motion state is the moving state; and re-detecting, when the moving parameter satisfies a preset condition, the signal quality parameters of the downlink signals received by the first target antennas, where the re-detected signal quality parameters corresponding to the first target antennas are used for determining whether to switch the antennas for receiving the downlink signals. In this way, when the terminal device is in the moving state and has the moving parameter satisfying the preset condition, a weighted average value or a maximum value of the re-detected signal quality parameters corresponding to the first target antennas is compared with the third preset threshold; and when the weighted average value or the maximum value is less than or equal to the third preset threshold, antennas for receiving the downlink signals are selected from the N antennas again, or when the weighted average value or the maximum value is greater than the third preset threshold, the original first target antennas are still used to receive the downlink signals, thereby improving the receiving performance of the terminal device in the moving state.

In an optional implementation, the moving parameter includes a moving duration and/or a moving distance; and the preset condition includes that the moving duration is greater than a preset duration and/or the moving distance is greater than a preset distance.

In an optional implementation, the signal quality parameter includes at least one of a signal to interference plus noise ratio, a reference signal received power, a parameter signal received quality, and a received signal strength indication.

According to a second aspect, an embodiment of this application provides a terminal device. The electronic device includes a memory and a processor, where the memory is configured to store a computer program, and the processor is configured to invoke the computer program to perform the foregoing antenna switching method.

According to a third aspect, an embodiment of this application provides a computer-readable storage medium, where the computer-readable storage medium stores a computer program or instructions, and when the computer program or the instructions are run, the foregoing antenna switching method is implemented.

According to a fourth aspect, an embodiment of this application provides a computer program product, including a computer program. When the computer program is run, a computer is enabled to perform the foregoing antenna switching method.

Effects of various possible implementations of the second aspect to the fourth aspect are similar to effects of the first aspect and the possible designs of the first aspect, and details are not described herein again.

DESCRIPTION OF EMBODIMENTS

For ease of describing the technical solutions in embodiments of this application clearly, in embodiments of this application, terms such as "first" and "second" are used for distinguishing between same or similar items with a basically same function and role. For example, a first chip and a second chip are merely used to distinguish between different chips, and are not intended to limit a sequence thereof. A person of ordinary skill in the art can understand that the terms, such as "first" and "second", do not define a quantity or an execution sequence, and the terms, such as "first" and "second", do not indicate a definite difference.

It should be noted that the term "example", "for example", or the like in embodiments of this application is used to represent giving an example, an illustration, or a description. Any embodiment or design solution described as "example" or "for example" in this application should not be construed as being preferred or advantageous over other embodiments or design solutions. In particular, the terms such as "exemplary" and "example" as used herein are intended to present the related concepts in a specific manner.

In the embodiments of this application, "at least one" refers to one or more, and "a plurality of" refers to two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally represents that the associated object is in an "or" relationship. "At least one of the following items (pieces)" or similar expressions refer to any combination of these items, including any combination of singular items (pieces) or plural items (pieces). For example, at least one of a, b, or c may represent "a", "b", "c"," "a and b", "a and c", "b and c", or "a, b, and c", where a, b, and c may be singular or plural.

With continuous development of wireless communication technologies, dependence of people on a terminal device is increasingly high, and the terminal device gradually becomes a common tool in people's daily life and work. In addition, to enable the terminal device to provide richer communication services, the terminal device gradually evolves from a single antenna to a plurality of antennas.

In some embodiments, the terminal device may support a multiple-antenna transmission technology (multiple-input multiple-output, MIMO), and may communicate with a network device using a plurality of antennas, for example, receive, using a plurality of antennas, downlink signals sent by the network device.

Figure 1:
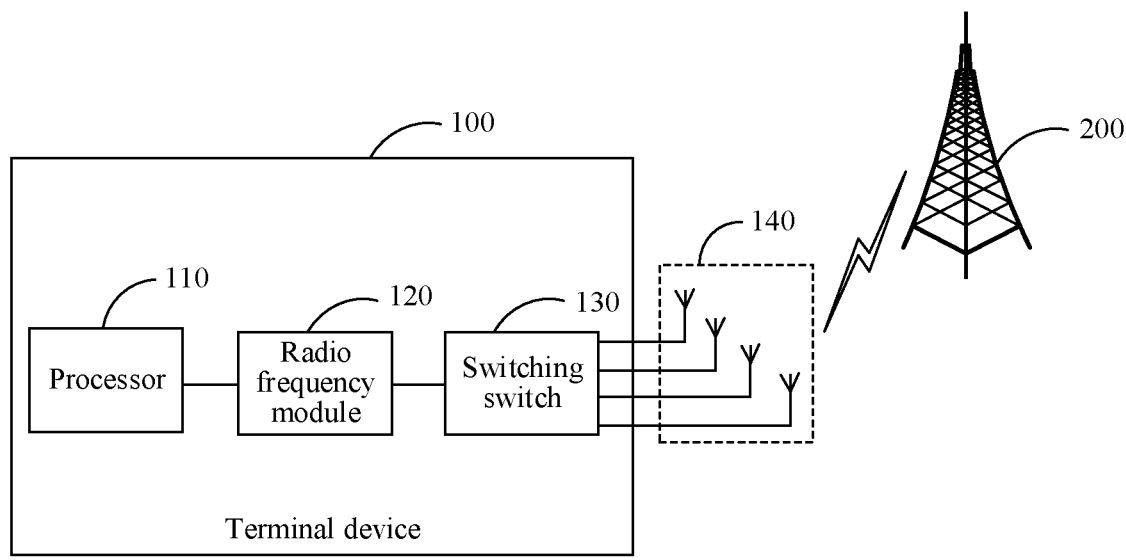
FIG. 1 is a schematic diagram of a scenario of a wireless communication system according to an embodiment of this application.

Exemplary descriptions are performed below with reference to a specific structure of a wireless communication system shown in FIG. 1. The wireless communication system shown in the embodiments of this application includes a terminal device 100 and a network device 200.

The terminal device 100 includes a processor 110, a radio frequency module 120, a switching switch 130, and an antenna set 140 that are sequentially connected. The radio frequency module 120 is used for radio frequency transmission and receiving, frequency synthesization (frequency mixing), power amplification, and the like, that is, the radio frequency module 120 may be configured to receive a signal and transmit a signal through a radio frequency resource, where the radio frequency module 120 includes a radio frequency transmission channel and a radio frequency receiving channel. The antenna set 140 includes a plurality of antennas. For example, the antenna set 140 includes four antennas. The switching switch 130 is configured to switch an antenna connected to the radio frequency module 120, to communicate with the network device 200 through the antenna connected to the radio frequency module 120. For example, the antenna connected to the radio frequency module 120 may be switched through the switching switch 130, to receive a downlink signal sent by the network device 200. The network device 200 may be a base station or a base station controller, configured to provide a cellular wireless communication service for the terminal device 100, and the terminal device 100 may communicate with the network device 200 through the antenna set 140.

In an application process, after the network device 200 sends a downlink signal, the antenna set 140 on the terminal device 100 may receive the downlink signal sent by the network device 200. When the switching switch 130 controls one or more antennas in the antenna set 140 to connect to the radio frequency module 120, the antenna connected to the radio frequency module 120 may transmit the received downlink signal to the radio frequency module 120. The signal of the downlink signal is subjected to filtering, amplification, and other processing through the radio frequency receiving channel in the radio frequency module 120, and then transferred to the processor 110, so that the processor 110 may obtain the downlink signal sent by the network device 200.

Figure 2:
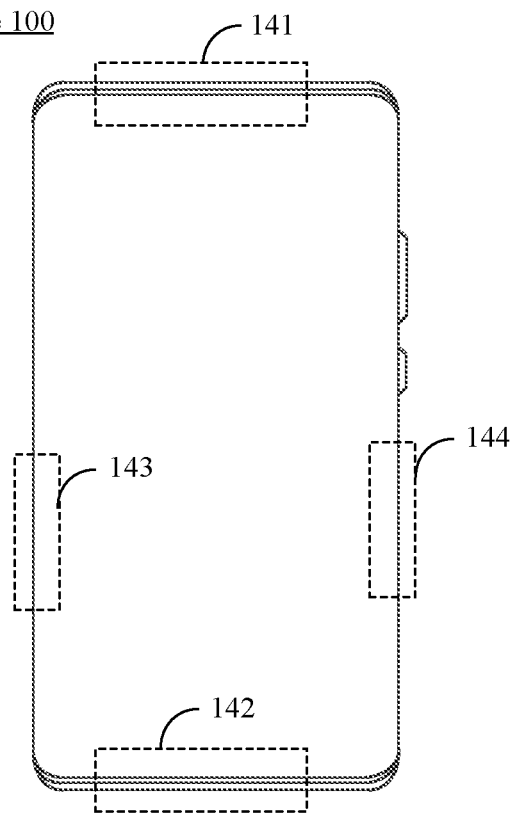
FIG. 2 is a schematic diagram of an antenna distribution in a terminal device according to an embodiment of this application.

In some embodiments, each antenna in the terminal device 100 is usually arranged in an internal bezel position of the terminal device 100. For example, as shown in FIG. 2, internal bezel positions of the terminal device 100 are equipped with four antennas, which are respectively a first antenna 141, a second antenna 142, a third antenna 143, and a fourth antenna 144. The first antenna 141 is located in a first bezel of the terminal device 100. The second antenna 142 is located in a second bezel of the terminal device 100. The third antenna 143 is located in a third bezel of the terminal device 100. The fourth antenna 144 is located in a fourth bezel of the terminal device 100.

It may be understood that when the terminal device 100 is in a portrait state, the first bezel may be a top bezel of the terminal device 100, the second bezel may be a bottom bezel of the terminal device 100, the third bezel may be a left bezel of the terminal device 100, and the fourth bezel may be a right bezel of the terminal device 100.

In this embodiment of this application, descriptions are performed using an example in which the quantity of antennas of the terminal device 100 is 4, that is, the antenna set 140 of the terminal device 100 may include four antennas. It may be understood that the quantity of antennas of the terminal device 100 in this embodiment of this application may alternatively be another quantity, for example, 6 or 8. The quantity of antennas of the terminal device 100 is not limited in this embodiment of this application.

In addition, FIG. 2 shows a schematic diagram of only an optional distribution of antenna distribution positions in the terminal device 100. It may be understood that the antennas in this embodiment of this application may alternatively be distributed in other positions. For example, the four antennas in this embodiment of this application may alternatively be sequentially distributed in positions such as a top left corner, a top right corner, a bottom left corner, and a bottom right corner of the terminal device 100. Distribution positions of the antennas in the terminal device 100 are not limited in this embodiment of this application.

When the terminal device 100 is in the connected state, to improve signal quality of the downlink signals sent by the network device 200 and received by the terminal device 100, the four antennas in the antenna set 140 may be all connected to the radio frequency module 120 through the switching switch 130, and the terminal device 100 receives, through the four connected antennas, the downlink signals sent by the network device 200, to improve signal strength of the downlink signals finally received by the terminal device 100, so that the terminal device can improve a demodulation capability in a case of a weak signal, to improve the receiving performance of the terminal device 100.

It should be noted that, when the terminal device 100 is in the connected state, the terminal device 100 may also determine, through the signal quality parameters of the received downlink signals and according to a preset policy, whether to switch to using two antennas or one antenna, to receive the downlink signals sent by the network device 200, so that the terminal device 100 can achieve a balance between the receiving performance and the power consumption.

When the terminal device 100 is in the idle state, if the terminal device 100 still uses the four connected antennas to receive the downlink signals sent by the network device 200, the terminal device 100 generates unnecessary power consumption, which is disadvantageous to power saving of the terminal device.

In the related technology, the terminal device 100 may preset whether each antenna in an antenna set is a main antenna or a diversity antenna. For example, the terminal device 100 has preset a main and diversity relationship among the four antennas before delivery, two of the antennas are used as main antennas, and the remaining two antennas are used as diversity antennas. When the terminal device 100 is in the connected state, a main antenna refers to an antenna for both transmitting and receiving signals, and a diversity antenna refers to an antenna for only receiving a signal but not transmitting a signal.

Therefore, when the terminal device 100 is in the idle state, the two preset main antennas may be connected to the radio frequency module 120 through the switching switch 130, to receive the downlink signals sent by the network device 200, and the preset two diversity antennas are disconnected from the radio frequency module 120, to reduce power consumption of the terminal device 100.

For example, as shown in FIG. 2, the first antenna 141 and the second antenna 142 may be preset as main antennas, and the third antenna 143 and the fourth antenna 144 may be preset as diversity antennas. Therefore, when the terminal device 100 is in the idle state, the first antenna 141 and the second antenna 142 may be connected to the radio frequency module 120, while the third antenna 143 and the fourth antenna 144 may be disconnected from the radio frequency module 120, and the first antenna 141 and the second antenna 142 are used to receive the downlink signals sent by the network device 200.

It should be noted that, the idle state refers to a state in which the terminal device camps on a cell satisfying a cell camping condition but does not initiate a service; and the connected state refers to a state in which the terminal device camps on a cell satisfying the cell camping condition, and a radio resource control (radio resource control, RRC) connection is established between the terminal device and the network device, so that the terminal device and the network device may perform data transmission and receiving, to execute a communication service such as voice.

However, when a user is using the terminal device 100, the terminal device 100 may be in different postures in different use states. For example, the terminal device 100 may be in a portrait state or a landscape state. In addition, when the user is using the terminal device 100, the user may hold the terminal device 100. When the user holds the terminal device 100, the user may hold the terminal device with a single hand (for example, hold the terminal device with a left hand or a right hand) or hold the terminal device with two hands (that is, hold the terminal device with both the left hand the right hand), and a holding position of the user may be a distribution position of an antenna in the terminal device 100.

In some scenarios, when the terminal device 100 is in the idle state, if a holding position of the user is a distribution position of a main antenna, a hand of the user blocks the main antenna. As a result, signal quality of a downlink signal received by the main antenna is reduced, thereby affecting the receiving performance of the terminal device 100.

For example, when the terminal device 100 is in the idle state, the first antenna 141 and the second antenna 142 are set as main antennas, and the first antenna 141 and the second antenna 142 are used to receive the downlink signals sent by the network device 200. In this case, if the user causes the terminal device 100 to be in the landscape state and holds the terminal device with two hands, the first antenna 141 and the second antenna 142 may be blocked by the hands of the user, to reduce signal quality of the downlink signals received by the first antenna 141 and the second antenna 142, thereby reducing signal quality of the downlink signals finally received by the terminal device 100 and affecting the receiving performance of the terminal device 100.

Based on this, the embodiments of this application provide an antenna switching method and a terminal device. When the terminal device 100 is in an idle state, a first target parameter is determined according to signal quality parameters corresponding to downlink signals received by N antennas in the terminal device 100, and some antennas with better signal quality are selected from the N antennas as first target antennas if the first target parameter is greater than or equal to a first preset threshold, to continue to receive, through the first target antennas, downlink signals sent by a network device 200. Therefore, when the first target antennas are used to continue to receive the downlink signals, signal quality of the downlink signals received by the first target antennas can be better, thereby improving signal quality of the downlink signals finally received by the terminal device 100, to improve receiving performance of the terminal device 100. In addition, because some antennas of the N antennas are used as the first target antennas, to continue to receive the downlink signals sent by the network device 200, power consumption of the terminal device 100 can be reduced.

For example, when the terminal device 100 is in the idle state, if the user causes the terminal device 100 to be in the landscape state and holds the terminal device with two hands, the first antenna 141 and the second antenna 142 may be blocked by the hands of the user, to reduce signal quality of the downlink signals received by the first antenna 141 and the second antenna 142, but signal quality of the downlink signals received by the third antenna 143 and the fourth antenna 144 is not affected because of hand holding of the user. Therefore, the terminal device may determine that signal quality parameters of downlink signals received by the third antenna 143 and the fourth antenna 144 are all greater than signal quality parameters of downlink signals received by the first antenna 141 and the second antenna 142, and therefore switches to connect the third antenna 143 and the fourth antenna 144 to the radio frequency module 120, to continue to receive, through the third antenna 143 and the fourth antenna 144, the downlink signals sent by the network device, thereby improving the receiving performance of the terminal device 100.

It should be noted that, the antenna switching method of the embodiments of this application may also be applicable to another scenario. When the terminal device 100 is in the idle state, the signal quality parameters of the downlink signals received by the N antennas are determined, and the first target antennas with better signal quality are selected from the antennas to receive the downlink signals, so that the receiving performance of the terminal device is not excessively affected because of factors such as different placement directions and different holding postures.

The antenna switching method provided in the embodiments of this application may be applied to a terminal device having a wireless communication function. The terminal device may also be referred to as a terminal (terminal), user equipment (user equipment, UE), a mobile station (mobile station, MS), a mobile terminal (mobile terminal, MT), and the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like. The embodiments of this application impose no limitation on a specific technology and a specific device form used by the terminal device.

Figure 3:
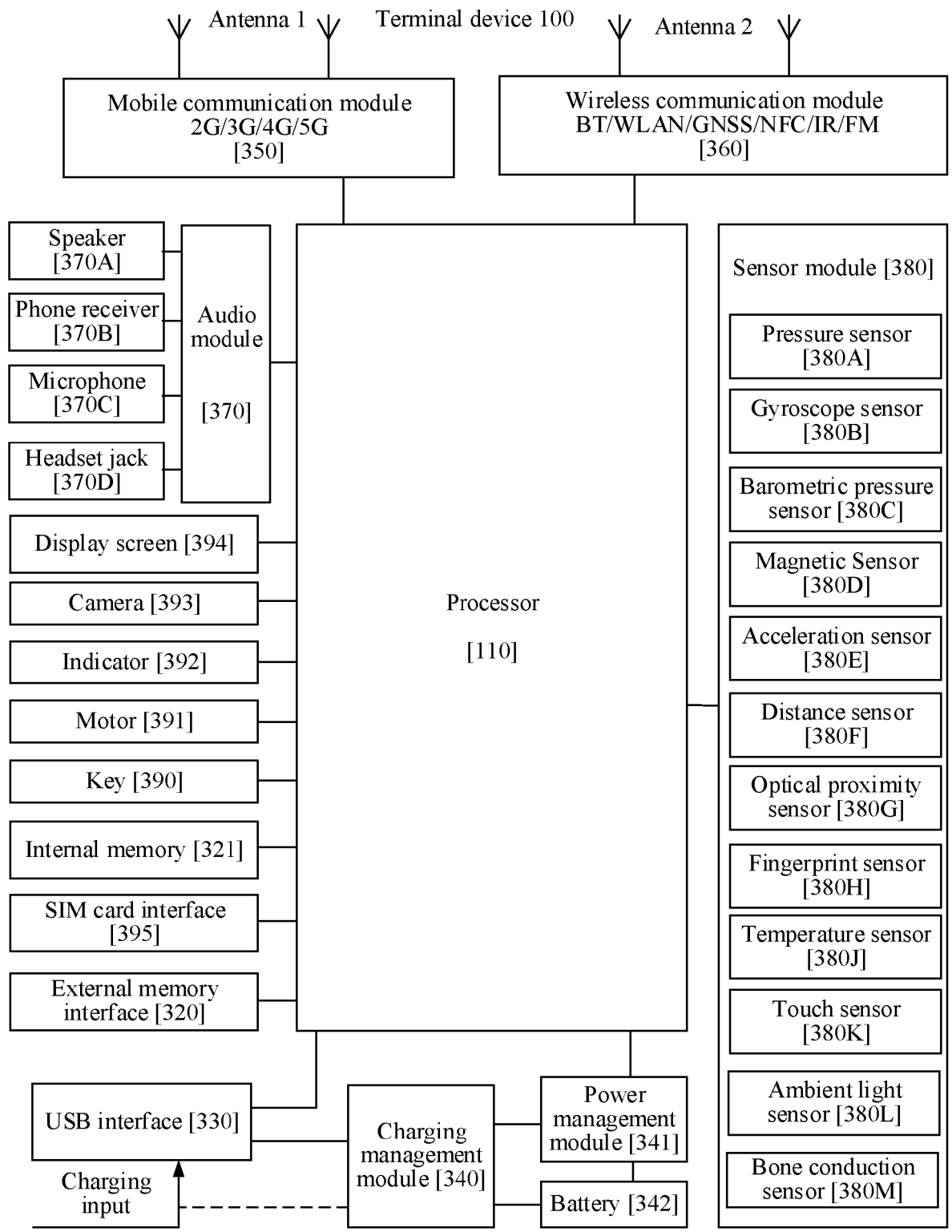
FIG. 3 is a schematic structural diagram of a hardware system of a terminal device according to an embodiment of this application.

For better understanding of embodiments of this application, the following describes a structure of the terminal device in embodiments of this application. For example, FIG. 3 is a schematic structural diagram of a hardware system of a terminal device according to an embodiment of this application.

The terminal device 100 may include a processor 110, an external memory interface 320, an internal memory 321, a universal serial bus (universal serial bus, USB) interface 330, a charging management module 340, a power management unit 341, a battery 342, an antenna 1, an antenna 2, a mobile communication module 350, a wireless communication module 360, an audio module 370, a speaker 370A, a phone receiver 370B, a microphone 370C, a headset jack 370D, a sensor module 380, a key 390, a motor 391, an indicator 392, a camera 393, a display screen 394, a subscriber identity module (subscriber identification module, SIM) card interface 395, and the like. The sensor module 380 may include a pressure sensor 380A, a gyroscope sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, and a bone conduction sensor 380M.

It may be understood that the structure shown in this embodiment of this application does not constitute a specific limitation on the terminal device 100. In some other embodiments of this application, the terminal device 100 may include more or fewer components than those shown in the figure, or some components may be combined, or some components may be split, or a different component deployment may be used. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate components, or may be integrated into one or more processors.

The controller may generate an operation control signal based on an instruction operation code and a timing signal, and implement control on instruction fetching and instruction execution.

A memory configured to store instructions and data may be further arranged in the processor 110. In some embodiments, the memory in the processor 110 is a cache memory. The memory may store an instruction or data that is recently used or to be cyclically used by the processor 110. If the processor 110 needs to use the instructions or the data again, the processor may call the instructions or the data from the memory, to avoid repeated access, and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be coupled to the touch sensor 380K, a charger, a flash, the camera 393, and the like by using different I2C bus interfaces respectively. For example, the processor 110 may be coupled to the touch sensor 380K by using the I2C interface, so that the processor 110 communicates with the touch sensor 380K by using the I2C bus interface, to implement a touch function of the terminal device 100.

The I2S interface may be used for audio communication. In some embodiments, the processor 110 may include a plurality of groups of I2S buses. The processor 110 may be coupled to the audio module 370 through the I2S bus to implement communication between the processor 110 and the audio module 370. In some embodiments, the audio module 370 may transfer an audio signal to the wireless communication module 360 by using the I2S interface, to implement a function of answering a call by using a Bluetooth headset.

The PCM interface may also be used for audio communication, and sampling, quantization, and encoding of an analog signal. In some embodiments, the audio module 370 may be coupled to the wireless communication module 360 by using the PCM bus interface. In some embodiments, the audio module 370 may alternatively transfer an audio signal to the wireless communication module 360 by using the PCM interface, to implement the function of answering a call by using a Bluetooth headset. Both the I2S interface and the PCM interface can be used for audio communication.

The UART interface is a universal serial data bus and is used for asynchronous communication. The bus may be a bidirectional communication bus. The bus converts data to be transmitted between serial communication and parallel communication. In some embodiments, the UART interface is generally configured to connect the processor 110 to the wireless communication module 360. For example, the processor 110 communicates with a Bluetooth module in the wireless communication module 360 by using a UART interface, to implement a Bluetooth function. In some embodiments, the audio module 370 may transfer an audio signal to the wireless communication module 360 by using the UART interface, to implement a function of playing music by using a Bluetooth headset.

The MIPI interface may be configured to connect the processor 110 to peripherals such as the display screen 394 and the camera 393. The MIPI includes a camera serial interface (camera serial interface, CSI), a display serial interface (display serial interface, DSI), and the like. In some embodiments, the processor 110 communicates with the camera 393 by using the CSI interface, to implement a photographing function of the terminal device 100. The processor 110 communicates with the display screen 394 through the DSI interface, to implement a display function of the terminal device 100.

The GPIO interface may be configured through software. The GPIO interface may be configured as a control signal or as a data signal. In some embodiments, the GPIO interface may be configured to connect the processor 110 to the camera 393, the display screen 394, the wireless communication module 360, the audio module 370, the sensor module 380, and the like. The GPIO interface may alternatively be configured as an I2C interface, an I2S interface, a UART interface, an MIPI interface, and the like.

The USB interface 330 is an interface that conforms to a USB standard specification, and may be specifically a Mini USB interface, a Micro USB interface, a USB Type C interface, or the like. The USB interface 330 may be configured to connect to a charger to charge the terminal device 100, or may be used for data transmission between the terminal device 100 and a peripheral device, or may be configured to connect to a headset to play audio by using the headset. The interface may also be configured to connect to another electronic device such as an AR device.

It may be understood that an interface connection relationship between the modules illustrated in this embodiment of this application is merely an example for description, and does not constitute a limitation on a structure of the terminal device 100. In some other embodiments of this application, the terminal device 100 may also adopt an interface connection manner different from that in the foregoing embodiment, or adopt a combination of a plurality of interface connection manners.

The charging management module 340 is configured to receive a charging input from the charger. The charger may be a wireless charger or may be a wired charger. In some embodiments of wired charging, the charging management module 340 may receive a charging input from the wired charger through the USB interface 330. In some embodiments of wireless charging, the charging management module 340 may receive a wireless charging input through a wireless charging coil of the terminal device 100. When charging the battery 342, the charging management module 340 may further supply power to the terminal device by using the power management module 341.

The power management module 341 is configured to connect to the battery 342, the charging management module 340, and the processor 110. The power management module 341 receives an input from the battery 342 and/or the charging management module 340, to supply power to the processor 110, the internal memory 321, the display screen 394, the camera 393, the wireless communication module 360, and the like. The power management module 341 may be further configured to monitor parameters such as a battery capacity, a battery cycle count, and a battery health status (leakage or impedance). In some other embodiments, the power management module 341 may be alternatively arranged in the processor 110. In some other embodiments, the power management module 341 and the charging management module 340 may also be arranged in a same component.

A wireless communication function of the terminal device 100 may be implemented by using the antenna 1, the antenna 2, the mobile communication module 350, the wireless communication module 360, the modem processor, the baseband processor, and the like.

The antenna 1 and the antenna 2 are configured to transmit or receive an electromagnetic wave signal. Each antenna in the terminal device 100 may be configured to cover one or more communication bands. Different antennas may also be reused to improve antenna utilization. For example, the antenna 1 may be reused as a diversity antenna of a wireless local area network. In some other embodiments, the antenna may be used in combination with a tuning switch.

In some embodiments, the foregoing antenna 1 may include four antennas, which are respectively the first antenna 141, the second antenna 142, the third antenna 143, and the fourth antenna 144 shown in FIG. 2.

The mobile communication module 350 may provide a solution to wireless communication such as 2G/3G/4G/5G applied to the terminal device 100. The mobile communication module 350 may be also referred to as the radio frequency module 120. The mobile communication module 350 may include at least one filter, a switch, a power amplifier, and a low noise amplifier (low noise amplifier, LNA). The mobile communication module 350 may receive an electromagnetic wave through the antenna 1, perform processing such as filtering or amplification on the received electromagnetic wave, and transfer a processed electromagnetic wave to the modem processor for demodulation. The mobile communication module 350 may further amplify a signal modulated by the modem processor, convert an amplified signal into an electromagnetic wave by using the antenna 1 for radiation. In some embodiments, at least some functional modules of the mobile communication module 350 may be arranged in the processor 110. In some embodiments, at least some functional modules of the mobile communication module 350 and at least some modules of the processor 110 may be arranged in a same component.

The modem processor may include a modulator and a demodulator. The modulator is configured to modulate a low frequency baseband signal to be sent into a medium and high frequency signal. The demodulator is configured to demodulate the received electromagnetic wave signal into a low-frequency baseband signal. Then, the demodulator transfers the low-frequency baseband signal obtained through demodulation to the baseband processor for processing. The low-frequency baseband signal is processed by the baseband processor and then transferred to an application processor. The application processor outputs a sound signal through an audio device (not limited to the speaker 370A, the phone receiver 370B, or the like), or displays an image or a video through the display screen 394. In some embodiments, the modem processor may be an independent device. In some other embodiments, the modem processor may be independent of the processor 110, and the modem processor and the mobile communication module 350 or another functional module are arranged in a same device.

The wireless communication module 360 can provide a solution for wireless communication including a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication technology (near field communication, NFC), an infrared technology (infrared, IR) and the like to be applied to the terminal device 100. The wireless communication module 360 may be one or more devices that integrate at least one communication processing module. The wireless communication module 360 receives an electromagnetic wave via the antenna 2, performs frequency modulation and filtering on the electromagnetic wave signal, and sends the processed signal to the processor 110. The wireless communication module 360 may further receive a to-be-sent signal from the processor 110, and perform frequency modulation and amplification on the signal. The amplified signal is converted into an electromagnetic wave and radiated out via the antenna 2.

In some embodiments, the antenna 1 and the mobile communication module 350 are coupled, and the antenna 2 and the wireless communication module 360 of the terminal device 100 are coupled, so that the terminal device 100 can communicate with a network and another device through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The terminal device 100 implements a display function through the GPU, the display screen 394, the application processor, and the like. The GPU is an image processing microprocessor and is connected to the display screen 394 and the application processor. The GPU is configured to perform mathematical and geometric calculations and graphics rendering. The processor 110 may include one or more GPUs that execute a program instruction to generate or change display information.

The display screen 394 is configured to display an image, display a video, receive a slide operation, and so on. The display screen 394 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diode, QLED), or the like. In some embodiments, the terminal device 100 may include one or more display screens 394.

The terminal device 100 may implement a photographing function by using the ISP, the camera 393, the video codec, the GPU, the display screen 394, the application processor, and the like.

The ISP is configured to process data fed back by the camera 393. For example, during photographing, a shutter is opened, light is transferred to a camera photosensitive element by using a lens, an optical signal is converted into an electrical signal, and the camera photosensitive element transfers the electrical signal to the ISP for processing, to convert the electrical signal into an image visible to a naked eye. The ISP may further perform algorithm optimization on noise, brightness, and complexion of the image. The ISP may further optimize parameters such as exposure and a color temperature of a photographing scene. In some embodiments, the ISP may be arranged in the camera 393.

The camera 393 is configured to capture a still image or video. An optical image of an object is generated through a lens and is projected onto a photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the terminal device 100 may include one or more cameras 393.

The digital signal processor is configured to process a digital signal, and in addition to a digital image signal, the digital signal processor may further process another digital signal. For example, when the terminal device 100 performs frequency channel selection, the digital signal processor is configured to perform Fourier transformation and the like on frequency channel energy.

The video codec is configured to compress or decompress a digital video. The terminal device 100 can support one or more video codecs. In this way, the terminal device 100 can play or record videos in a plurality of encoding formats, for example, moving picture experts group (moving picture experts group, MPEG)1, MPEG2, MPEG3, and MPEG4.

The NPU is a neural-network (neural-network, NN) computing processor that quickly processes input information by referring to a structure of a biological neural network, for example, by referring to a transmission mode between human brain neurons, and can further perform self-learning continuously. Applications such as intelligent cognition, for example, image recognition, face recognition, speech recognition, and text understanding, of the terminal device 100 can be implemented by using the NPU.

The external memory interface 320 may be configured to connect to an external storage card, for example, a micro SD card, to expand a storage capability of the terminal device 100. The external memory card communicates with the processor 110 through the external memory interface 320, to implement a data storage function, for example, to store files such as music and a video in the external memory card.

The internal memory 321 may be configured to store computer-executable program code. The computer-executable program code includes instructions. The built-in memory 321 may include a program storage area and a data storage area. The program storage area may store an operating system, an application program required by at least one function (for example, functions of a voice playing and an image playing), and the like. The data storage area may store data (such as audio data and an address book) created during use of the terminal device 100, and the like. In addition, the internal memory 321 may include a high-speed random access memory, or may include a non-volatile memory such as at least one magnetic disk memory, a flash memory, or a universal flash storage (universal flash storage, UFS). The processor 110 executes various functional applications and data processing of the terminal device 100 by running an instruction stored in the internal memory 321 and/or an instruction stored in the memory arranged in the processor.

The terminal device 100 may implement an audio function by using the audio module 370, the speaker 370A, the phone receiver 370B, the microphone 370C, the headset jack 370D, the application processor, and the like, for example, music playback and sound recording.

The audio module 370 is configured to convert digital audio information into an analog audio signal for output, and is further configured to convert an analog audio input into a digital audio signal. The audio module 370 may be further configured to code and decode the audio signal. In some embodiments, the audio module 370 may be arranged in the processor 110, or some function modules of the audio module 370 are arranged in the processor 110.

The speaker 370A, also referred to as a "horn", is configured to convert an electrical audio signal into a sound signal. Music can be listened to or a hands-free call can be answered through the speaker 370A in the terminal device 100.

The phone receiver 370B, also referred to as a "handset", is configured to convert an electrical audio signal into a sound signal. When a call is answered or audio information is listened to by using the terminal device 100, the phone receiver 370B may be put close to a human ear to listen to a voice.

The microphone 370C, also referred to as a "voice tube" or a "mike", is configured to convert a sound signal into an electrical signal. When making a call or sending voice information, the user may make a sound near the microphone 370C through the mouth of the user, to input a sound signal into the microphone 370C. At least one microphone 370C may be arranged in the terminal device 100. In some other embodiments, two microphones 370C may be arranged in the terminal device 100, to collect a sound signal and implement a noise reduction function. In some other embodiments, three, four, or more microphones 370C may be alternatively arranged in the terminal device 100, to collect a sound signal, implement noise reduction, recognize a sound source, implement a directional recording function, and the like.

The headset jack 370D is configured to connect to a wired headset. The headset jack 370D may be a USB interface 330, or may be a 3.5 mm open mobile electronic device platform (open mobile terminal platform, OMTP) standard interface or cellular telecommunications industry association of the USA (cellular telecommunications industry association of the USA, CTIA) standard interface.

The pressure sensor 380A is used to sense a pressure signal, and can convert the pressure signal into an electrical signal. In some embodiments, the pressure sensor 380A may be arranged in the display screen 394. There are many types of pressure sensors 380A, for example, a resistive pressure sensor, an inductive pressure sensor, and a capacitive pressure sensor. The capacitive pressure sensor may include at least two parallel plates having conductive materials. When a force is applied onto the pressure sensor 380A, a capacitance between electrodes changes. The terminal device 100 determines intensity of the pressure based on a change in the capacitance. When a touch operation is applied to the display screen 394, the terminal device 100 detects intensity of the touch operation based on the pressure sensor 380A. The terminal device 100 may also calculate a touch position based on a detection signal of the pressure sensor 380A. In some embodiments, touch operations that are performed on a same touch position but have different touch operation intensity may correspond to different operation instructions.

The gyroscope sensor 380B may be configured to determine a movement posture of the terminal device 100. In some embodiments, angular velocities of the terminal device 100 around three axes (that is, an x axis, a y axis, and a z axis) may be determined through the gyroscope sensor 380B. The gyroscope sensor 380B may be used for image stabilization during shooting. For example, when a shutter is pressed, the gyroscope sensor 380B detects an angle at which the terminal device 100 jitters, and calculates, based on the angle, a distance for which a lens module needs to compensate, so that the lens cancels the jitter of the terminal device 100 through a reverse motion, thereby implementing image stabilization. The gyroscope sensor 380B may be further used in navigation and a motion sensing game scenario.

The barometric pressure sensor 380C is configured to measure barometric pressure. In some embodiments, the terminal device 100 calculates an altitude by using a barometric pressure value measured by the barometric pressure sensor 380C, to assist in positioning and navigation.

The magnetic sensor 380D includes a Hall effect sensor. The terminal device 100 may detect opening and closing of a flip cover or a leather case by using the magnetic sensor 380D. In some embodiments, when the terminal device 100 is a clamshell phone, the terminal device 100 may detect opening and closing of a flip cover according to the magnetic sensor 380D. Then, according to a detected opening and closing state of the leather case or an opening and closing state of the flip cover, characteristics such as automatic unlocking of the flip cover are set.

The acceleration sensor 380E may detect magnitude of accelerations in various directions (generally on three axes) of the terminal device 100, may detect magnitude and a direction of the gravity when the terminal device 100 is static, and may be further configured to identify a posture of the terminal device, and is applied to applications such as landscape and portrait orientation switching and a pedometer.

The distance sensor 380F is configured to measure a distance. The terminal device 100 may measure a distance through infrared light or laser. In some embodiments, in a photographing scene, the terminal device 100 may measure a distance by using the distance sensor 380F, to implement quick focusing.

The optical proximity sensor 380G may include, for example, a light-emitting diode (LED) and an optical detector such as a photodiode. The light-emitting diode may be an infrared light-emitting diode. The terminal device 100 emits infrared light through the light-emitting diode. The terminal device 100 uses a photodiode to detect infrared reflected light from an object nearby. When sufficient reflected light is detected, it may be determined that there is an object near the terminal device 100. When insufficient reflected light is detected, the terminal device 100 may determine that there is no object near the terminal device 100. The terminal device 100 may detect, by using the optical proximity sensor 380G, that the user holds the terminal device 100 close to an ear to make a call, to automatically turn off the screen for power saving. The optical proximity sensor 380G may also be used in a smart cover mode or a pocket mode to automatically unlock or lock the screen.

The ambient light sensor 380L is configured to perceive ambient light brightness. The terminal device 100 may adaptively adjust a brightness of the display screen 394 based on the perceived ambient light brightness. The ambient light sensor 380L may also be configured to automatically adjust white balance during photographing. The ambient light sensor 380L may further cooperate with the optical proximity sensor 380G to detect whether the terminal device 100 is in a pocket, to prevent an accidental touch.

The fingerprint sensor 380H is configured to collect a fingerprint. The terminal device 100 may implement fingerprint-based unlocking, application lock accessing, fingerprint-based photographing, fingerprint-based call answering, and the like by using a feature of the collected fingerprint.

The temperature sensor 380J is configured to detect a temperature. In some embodiments, the terminal device 100 executes a temperature processing policy by using the temperature detected by the temperature sensor 380J. For example, when the temperature reported by the temperature sensor 380J exceeds a threshold, the terminal device 100 lowers performance of a processor located near the temperature sensor 380J, to reduce power consumption and implement thermal protection. In some other embodiments, when the temperature is below another threshold, the terminal device 100 heats the battery 342, to avoid an abnormal shutdown of the terminal device 100 caused by a low temperature. In some other embodiments, when the temperature is lower than still another threshold, the terminal device 100 boosts an output voltage of the battery 342 to avoid abnormal shutdown caused by a low temperature.

The touch sensor 380K is also referred to as a "touch device". The touch sensor 380K may be arranged on the display screen 394. The touch sensor 380K and the display screen 394 form a touchscreen, which is also referred to as a "touchscreen". The touch sensor 380K is configured to detect a touch operation performed on or near the touch sensor. The touch sensor may transfer the detected touch operation to the application processor, to determine a touch event type. A visual output related to the touch operation may be provided through the display screen 394. In some other embodiments, the touch sensor 380K may be alternatively arranged on a surface of the terminal device 100, and is located on a position different from that of the display screen 394.

The bone conduction sensor 380M may acquire a vibration signal. In some embodiments, the bone conduction sensor 380M may obtain a vibration signal of a vibration bone of a human vocal-cord part. The bone conduction sensor 380M may also come into contact with a human pulse to receive a blood pressure pulse signal. In some embodiments, the bone conduction sensor 380M may be alternatively arranged in a headset, to form a bone conduction headset. The audio module 370 may parse out a voice signal based on the vibration signal of the vibration bone of the vocal-cord part that is obtained by the bone conduction sensor 380M, to implement a voice function. The application processor may parse heart rate information based on the blood pressure beating signal obtained by the bone conduction sensor 380M, to implement a heart rate detection function.

The key 390 includes a power on/off key, a volume key, and the like. The key 390 may be a mechanical key or a touch key. The terminal device 100 may receive a key input, generate a key signal input related to user setting and function control of the terminal device 100.

The motor 391 may generate a vibration prompt. The motor 391 may be configured for an incoming call vibration prompt and a touch vibration feedback. For example, touch operations applied to different applications (for example, photographing and audio playback) may correspond to different vibration feedback effects. For touch operations performed on different regions of the display screen 394, the motor 391 may correspond to different vibration feedback effects. Different application scenarios (for example, a time reminder, information receiving, an alarm clock, and a game) may further correspond to different vibration feedback effects. Customization of a touch vibration feedback effect may be further supported.

The indicator 392 may be an indicator light, and may be configured to indicate a charging status and a battery level change, or may be configured to indicate a message, a missed call, a notification, and the like.

The SIM card port 395 is configured to connect to a SIM card. The SIM card may be inserted into the SIM card interface 395 or unplugged from the SIM card interface 395, to come into contact with or be separated from the terminal device 100. The terminal device 100 may support one or more SIM card interfaces. The SIM card interface 395 may support a Nano SIM card, a Micro SIM card, a SIM card, and the like. A plurality of cards may be inserted into a same SIM card interface 395 simultaneously. The plurality of cards may be of the same type or different types. The SIM card interface 395 is also compatible with different types of SIM cards. The SIM card interface 395 may also be compatible with external memory cards. The terminal device 100 interacts with a network through the SIM card, to implement a call function, a data communication function, and the like. In some embodiments, the terminal device 100 uses an eSIM, that is, an embedded SIM card. The eSIM card may be embedded in the terminal device 100, and cannot be separated from the terminal device 100.

The following describes the technical solutions of this application and how to resolve the foregoing technical problems according to the technical solutions of this application in detail by using specific embodiments. The following several specific embodiments may be independently implemented, and may also be combined with each other, and the same or similar concepts or processes may not be described repeatedly in some embodiments.

Figure 4:
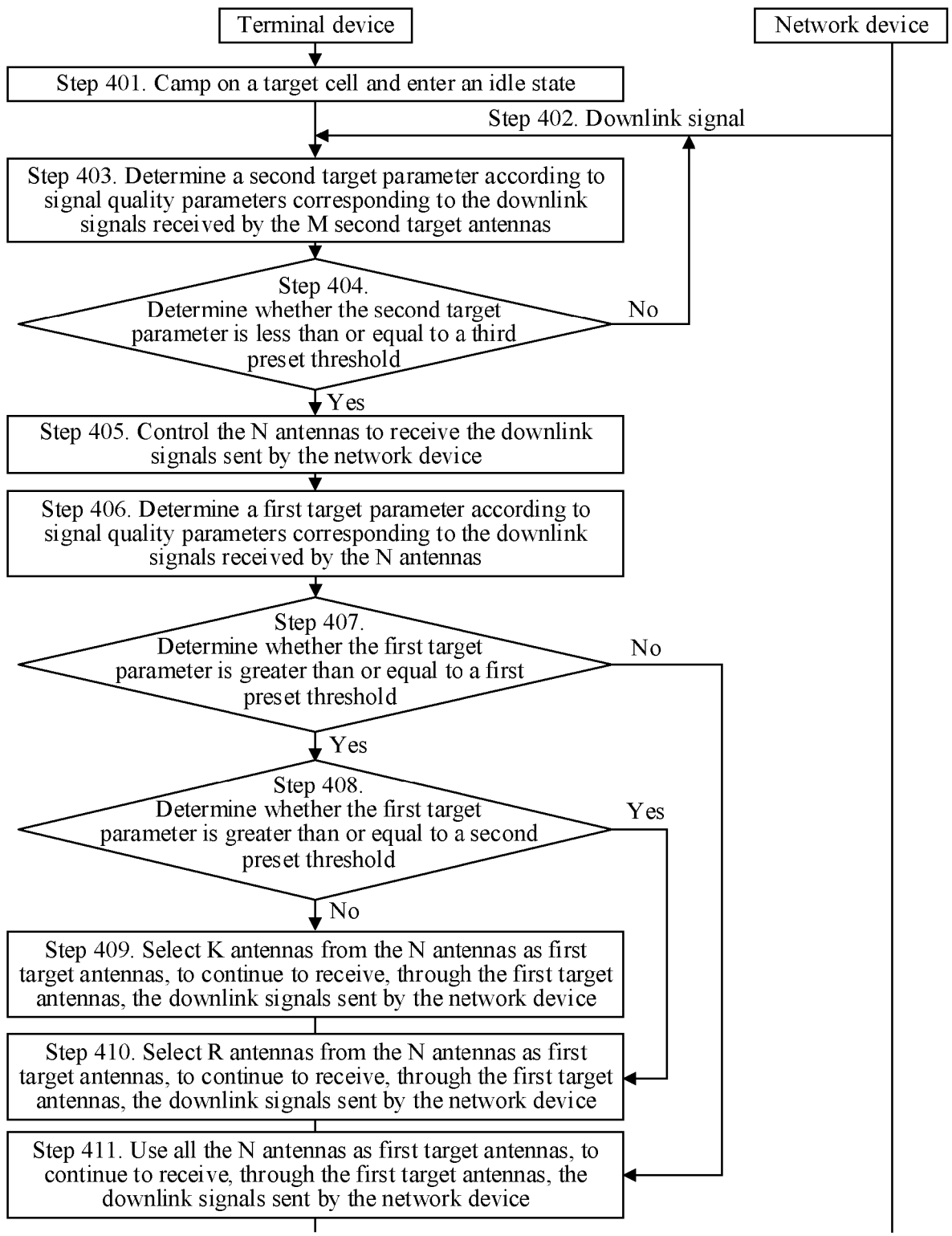
FIG. 4 is a flowchart of an antenna switching method in a scenario according to an embodiment of this application.

For example, FIG. 4 is a flowchart of an antenna switching method in a scenario according to an embodiment of this application. As shown in FIG. 4, the antenna switching method may specifically include the following steps.

Step 401. A terminal device camps on a target cell and enters an idle state.

In some scenarios, when being powered on or being disconnected from a network and then accessing the network again, the terminal device executes cell selection. The cell selection refers to a process in which the terminal device selects an eligible cell and camps on the cell when accessing the network for the first time. After the terminal device camps on a target cell, the terminal device enters an idle state. The target cell refers to a cell on which the terminal device currently camps.

Step 402. The terminal device receives, based on M connected second target antennas, downlink signals sent by a network device.

When the terminal device camps on the target cell and enters the idle state, that is, the terminal device is powered on and then is in the idle state for the first time, M main antennas preset by the terminal device may be used as second target antennas; or any M antennas of the terminal device before being powered off or disconnected from the network may be used as second target antennas; or M antennas with top-ranked signal quality parameters (ranked in descending order of signal quality parameters) of the terminal device before being powered off or disconnected from the network may be used as second target antennas.

When the terminal device is in the idle state, the network device sends downlink signals to the terminal device, and the second target antennas in the terminal device are connected to a radio frequency module. Therefore, the received downlink signals may be sent to the radio frequency module based on the second target antennas, and the radio frequency module performs filtering, amplification, and other processing on the downlink signals, and then transmits the downlink signals to a processor of the terminal device.

Optionally, the foregoing downlink signal may be a downlink reference signal, for example, a cell reference signal (cell reference signal, CRS) or a channel state information-reference signal (channel state information-reference signal, CSI-RS).

In this embodiment of this application, the quantity of antennas in the terminal device is N, and the quantity of the second target antennas is M, where M is a positive integer less than N. That is to say, when the terminal device camps on the target cell and enters the idle state, some antennas in the terminal device are connected to the radio frequency module, and some other antennas are disconnected from the radio frequency module, to receive, through the connected second target antennas, the downlink signals sent by the network device, thereby reducing power consumption of the terminal device.

For example, N may be 4, and M may be 2. To be specific, the quantity of the antennas in the terminal device is 4, and the quantity of the second target antennas is 2.

Step 403. The terminal device determines a second target parameter according to signal quality parameters corresponding to the downlink signals received by the M second target antennas.

In this embodiment of this application, after the processor of the terminal device obtains the downlink signals transmitted by the M second target antennas, the processor obtains a signal quality parameter corresponding to a downlink signal transmitted by each second target antenna; and then calculates a second feature value of the signal quality parameters corresponding to the downlink signals received by the M second target antennas, and uses the second feature value as the second target parameter. The second feature value may be a weighted average value or a maximum value of the signal quality parameters corresponding to the M second target antennas.

In an optional implementation, the processor may calculate a weighted average value of the signal quality parameters corresponding to the downlink signals received by the M second target antennas, and use the weighted average value as the second target parameter.

During actual application, weights respectively corresponding to the signal quality parameters of the downlink signals received by the M second target antennas may be set according to an actual situation. In addition, the weights respectively corresponding to the signal quality parameters of the downlink signals received by the M second target antennas may be equal or may not be equal.

Using an example in which the weights respectively corresponding to the signal quality parameters of the downlink signals received by the M second target antennas are equal and all the weights are 1, the foregoing weighted average value of the signal quality parameters corresponding to the downlink signals received by the M second target antennas may be understood as an average value of the signal quality parameters corresponding to the downlink signals received by the M second target antennas.

For example, the second target antennas are the first antenna 141 and the second antenna 142 shown in FIG. 2. In addition, a signal quality parameter $Q_{ANT1}$ corresponding to a downlink signal received by the first antenna 141 is equal to −120 dBm, and a signal quality parameter $Q_{ANT2}$ corresponding to a downlink signal received by the second antenna 142 is equal to −118 dBm. Therefore, the second target parameter may be $(Q_{ANT1}+Q_{ANT2})/2=-119$ dBm.

In another optional implementation, the processor may extract a maximum value from the signal quality parameters corresponding to the downlink signals received by the M second target antennas, and use the maximum value as the second target parameter.

For example, the second target antennas are the first antenna 141 and the second antenna 142 shown in FIG. 2. In addition, a signal quality parameter $Q_{ANT1}$ corresponding to a downlink signal received by the first antenna 141 is equal to −120 dBm, and a signal quality parameter $Q_{ANT2}$ corresponding to a downlink signal received by the second antenna 142 is equal to −118 dBm. Therefore, the second target parameter may be −118 dBm.

Certainly, it may be understood that in addition to the weighted average value and the maximum value of the signal quality parameters corresponding to the downlink signals received by the M second target antennas, the foregoing second feature value may alternatively be another feature value. For example, the second feature value may alternatively be a minimum value or a sum value of the signal quality parameters corresponding to the downlink signals received by the M second target antennas (that is, a value obtained by adding the signal quality parameters corresponding to the downlink signals received by the M second target antennas).

In some embodiments, the processor may be any one of a modem processor, a baseband processor, and an application processor. For example, the processor may be a modem processor, and then a signal quality parameter corresponding to an uplink signal may be obtained from the uplink signal through the modem processor.

Step 404. The terminal device determines whether the second target parameter is less than or equal to a third preset threshold.

In this embodiment of this application, the third preset threshold is set in the terminal device in advance. After the processor in the terminal device performs calculation to obtain the second target parameter, the processor compares the second target parameter with the third preset threshold, to determine whether the second target parameter is less than or equal to the third preset threshold.

It should be noted that, the third preset threshold may be set according to an empirical value. When the second target parameter is of a different type, the third preset threshold may also have a different specific value. For example, when the second target parameter is an average value of the signal quality parameters corresponding to the downlink signals received by the two second target antennas, the third preset threshold may be −115 dBm; and when the second target parameter is a sum of the signal quality parameters corresponding to the downlink signals received by the two second target antennas, the third preset threshold may be −230 dBm.

Step 405. The terminal device controls, if the second target parameter is less than or equal to a third preset threshold, the N antennas to receive the downlink signals sent by the network device.

If the processor determines that the second target parameter is less than or equal to the third preset threshold, it indicates that signal quality of the downlink signals received through the second target antennas is not good. If the second target antennas are still used to continue to receive the downlink signals sent by the network device, a paging abnormality may occur.

Therefore, to improve signal quality of the downlink signals received by the terminal device in the idle state, all the N antennas in the terminal device may be controlled to connect to the radio frequency module, the N antennas send the received downlink signals to the radio frequency module, and the radio frequency module performs filtering, amplification, and other processing on the downlink signals, and then transmits the downlink signals to the processor of the terminal device.

For example, the second target parameter is equal to −119 dBm, the third preset threshold is −115 dBm, and then it is determined that the second target parameter is less than the third preset threshold. Therefore, the terminal device controls the N antennas to receive the downlink signals sent by the network device.

It should be noted that, when the second target parameter is greater than the third preset threshold, it indicates that signal quality of the downlink signals received through the second target antennas is good. Therefore, the second target antennas may be used to continue to receive the downlink signals sent by the network device.

Step 406. The terminal device determines a first target parameter according to signal quality parameters corresponding to the downlink signals received by the N antennas.

In this embodiment of this application, after the processor of the terminal device obtains the downlink signals transmitted by the N antennas, the processor obtains a signal quality parameter corresponding to a downlink signal transmitted by each antenna; and then calculates a first feature value of the signal quality parameters corresponding to the downlink signals received by the N antennas, and uses the first feature value as the first target parameter. The first feature value is a weighted average value or a maximum value of the signal quality parameters corresponding to the N antennas.

In an optional implementation, the processor may calculate a weighted average value of the signal quality parameters corresponding to the downlink signals received by the N antennas, and use the weighted average value as the first target parameter.

During actual application, weights respectively corresponding to the signal quality parameters of the downlink signals received by the N antennas may be set according to an actual situation. In addition, the weights respectively corresponding to the signal quality parameters of the downlink signals received by the N antennas may be equal or may not be equal.

Using an example in which the weights respectively corresponding to the signal quality parameters of the downlink signals received by the N antennas are equal and all the weights are 1, the foregoing weighted average value of the signal quality parameters corresponding to the downlink signals received by the N antennas may be understood as an average value of the signal quality parameters corresponding to the downlink signals received by the N antennas.

For example, the N antennas in the terminal device are respectively the first antenna 141, the second antenna 142, the third antenna 143, and the fourth antenna 144 shown in FIG. 2. In this case, a signal quality parameter $Q_{ANT1}$ corresponding to a downlink signal received by the first antenna 141 is equal to −120 dBm, a signal quality parameter $Q_{ANT2}$ corresponding to a downlink signal received by the second antenna 142 is equal to −118 dBm, a signal quality parameter $Q_{ANT3}$ corresponding to a downlink signal received by the third antenna 143 is equal to −110 dBm, and a signal quality parameter $Q_{ANT4}$ corresponding to a downlink signal received by the fourth antenna 144 is equal to −106 dBm. Therefore, the first target parameter may be $(Q_{ANT1}+Q_{ANT2}+Q_{ANT3}+Q_{ANT4})/4 = -113.5$ Bm.

In another optional implementation, the processor may extract a maximum value from the signal quality parameters corresponding to the downlink signals received by the N antennas, and use the maximum value as the first target parameter.

For example, the N antennas in the terminal device are respectively the first antenna 141, the second antenna 142, the third antenna 143, and the fourth antenna 144 shown in FIG. 2. In this case, a signal quality parameter $Q_{ANT1}$ corresponding to a downlink signal received by the first antenna 141 is equal to −120 dBm, a signal quality parameter $Q_{ANT2}$ corresponding to a downlink signal received by the second antenna 142 is equal to −118 dBm, a signal quality parameter $Q_{ANT3}$ corresponding to a downlink signal received by the third antenna 143 is equal to −110 dBm, and a signal quality parameter $Q_{ANT4}$ corresponding to a downlink signal received by the fourth antenna 144 is equal to −106 dBm. Therefore, the first target parameter may be −106 dBm.

Certainly, it may be understood that in addition to the weighted average value and the maximum value of the signal quality parameters corresponding to the downlink signals received by the N antennas, the foregoing first feature value may alternatively be another feature value. For example, the first feature value may alternatively be a sum value of the signal quality parameters corresponding to the downlink signals received by the N antennas (that is, a value obtained by adding the signal quality parameters corresponding to the downlink signals received by the N antennas).

Step 407. The terminal device determines whether the first target parameter is greater than or equal to a first preset threshold.

In this embodiment of this application, the first preset threshold is set in the terminal device in advance. After the processor in the terminal device performs calculation to obtain the first target parameter, the processor compares the first target parameter with the first preset threshold, to determine whether the first target parameter is greater than or equal to the first preset threshold.

It should be noted that, the first preset threshold may be set according to an empirical value. When the first target parameter is of a different type, the first preset threshold may also have a different specific value. For example, when the first target parameter is an average value of the signal quality parameters corresponding to the downlink signals received by the four antennas, the first preset threshold may be −120 dBm; and when the first target parameter is a sum of the signal quality parameters corresponding to the downlink signals received by the four antennas, the first preset threshold may be −480 dBm.

When the first target parameter is greater than or equal to the first preset threshold, the following step 408 is executed; and when the first target parameter is less than the first preset threshold, the following step 411 is executed.

In some embodiments, the third preset threshold is greater than the first preset threshold. By properly setting a magnitude relationship between the third preset threshold and the first preset threshold, a ping-pong effect during antenna switching can be suppressed, that is, antennas in the terminal device that are connected to the radio frequency module can be prevented from continuously switching back and forth between M antennas and N antennas.

Step 408. The terminal device determines whether the first target parameter is greater than or equal to a second preset threshold if the first target parameter is greater than or equal to the first preset threshold.

If the processor determines that the first target parameter is greater than or equal to the first preset threshold, it indicates that signal quality of downlink signals received through some antennas of the N antennas is better. Therefore, the processor may select some antennas from the N antennas as first target antennas, to continue to receive, through the first target antennas, downlink signals sent by the network device. Signal quality parameters of the downlink signals received by the first target antennas are greater than signal quality parameters of downlink signals received by other antennas different from the first target antennas in the N antennas.

That is to say, the processor may select the first target antennas with better signal quality from the N antennas, to continue to receive the downlink signals sent by the network device, thereby improving signal quality of the downlink signals finally received by the terminal device, to improve receiving performance of the terminal device.

To further balance a relationship between power consumption and receiving performance of the terminal device, the processor continues to compare the first target parameter with the second preset threshold if the first target parameter is greater than or equal to the first preset threshold. When the first target parameter is less than the second preset threshold, the following step 409 is executed; and when the first target parameter is greater than or equal to the second preset threshold, the following step 410 is executed.

The second preset threshold is greater than the first preset threshold, and the second preset threshold may also be set according to an empirical value. For example, the second preset threshold may be −110 dBm.

Step 409. The terminal device selects K antennas from the N antennas as first target antennas if the first target parameter is less than the second preset threshold, to continue to receive, through the first target antennas, the downlink signals sent by the network device.

If the processor determines that the first target parameter is less than the second preset threshold, that is, the first target parameter is greater than or equal to the first preset threshold and is less than the second preset threshold, the terminal device may rank the signal quality parameters corresponding to the downlink signals received by the N antennas in descending order, and select K top-ranked antennas as first target antennas, to continue to receive, through the first target antennas, the downlink signals sent by the network device.

K is a positive integer less than N. Therefore, if the first target parameter is greater than or equal to the first preset threshold and less than the second preset threshold, the processor may select K first target antennas with better signal quality from the N antennas, to continue to receive the downlink signals sent by the network device, thereby improving signal quality of the downlink signals finally received by the terminal device, to improve receiving performance of the terminal device.

For example, the first target parameter is −113.5 Bm, the first preset threshold may be −120 dBm, and the second preset threshold may be −110 dBm. Then, it may be determined that the first target parameter is greater than the first preset threshold and less than the second preset threshold. The signal quality parameters corresponding to the downlink signals received by the first antenna 141, the second antenna 142, the third antenna 143, and the fourth antenna 144 are ranked in descending order, which is: the signal quality parameter $Q_{ANT4}$ (−106 dBm) corresponding to the fourth antenna 144, the signal quality parameter $Q_{ANT3}$ (−110 dBm) corresponding to the third antenna 143, the signal quality parameter $Q_{ANT2}$ (−118 dBm) corresponding to the second antenna 142, and the signal quality parameter $Q_{ANT1}$ (−120 dBm) corresponding to the first antenna 141. Using an example in which K is equal to 2, the fourth antenna 144 and the third antenna 143 may be used as the first target antennas, to continue to receive, through the first target antennas, the downlink signals sent by the network device.

Step 410. The terminal device selects R antennas from the N antennas as first target antennas if the first target parameter is greater than or equal to the second preset threshold, to continue to receive, through the first target antennas, the downlink signals sent by the network device.

If the processor determines that the first target parameter is greater than or equal to the second preset threshold, that is, the first target parameter is greater than the second preset threshold and also greater than the first preset threshold, the terminal device may rank the signal quality parameters corresponding to the downlink signals received by the N antennas in descending order, and select R top-ranked antennas as first target antennas, to continue to receive, through the first target antennas, the downlink signals sent by the network device.

R is a positive integer less than N. Therefore, if the first target parameter is greater than or equal to the second preset threshold, the processor may select R first target antennas with best or better signal quality from the N antennas, to continue to receive the downlink signals sent by the network device, thereby improving signal quality of the downlink signals finally received by the terminal device, to improve receiving performance of the terminal device.

In addition, K is greater than R. That is to say, when the first target parameter is larger, the quantity of selected first target antennas is smaller. Signal quality of received downlink signals can still satisfy requirements through a small quantity of first target antennas. Receiving downlink signals with a smaller quantity of first target antennas while ensuring the receiving performance of the terminal device can further reduce the power consumption of the terminal device, so that the terminal device can achieve a balance between the receiving performance and the power consumption. When the first target parameter is smaller, signal quality of received downlink signals satisfies requirements through a large quantity of first target antennas while the terminal device allows reduced maximum power consumption, thereby improving the receiving performance of the terminal device, so that the terminal device can achieve a balance between the receiving performance and the power consumption.

For example, K may be 2, R may be 1, and N may be 4. Therefore, if the first target parameter is greater than or equal to the first preset threshold and less than the second preset threshold, two antennas may be selected from the four antennas as first target antennas, to continue to receive, through the first target antennas, downlink signals sent by the network device; and if the first target parameter is greater than or equal to the second preset threshold, one antenna may be selected from the four antennas as a first target antenna, to continue to receive, through the first target antenna, a downlink signal sent by the network device.

In the foregoing step 408 to step 410, if the first target parameter is greater than or equal to the first preset threshold, the first target parameter continues to be compared with the second preset threshold, thereby selecting a different quantity of first target antennas to continue to receive downlink signals sent by the network device.

Certainly, it may be understood that after step 407, if the first target parameter is greater than or equal to the first preset threshold, K or R antennas may alternatively be directly selected from the N antennas as first target antennas, to continue to receive, through the first target antennas, downlink signals sent by the network device, and it is not necessary to continue to compare the first target parameter with the second preset threshold.

Alternatively, if the first target parameter is greater than or equal to the first preset threshold, a plurality of different preset thresholds may be set, and a corresponding quantity of antennas are selected as first target antennas according to a preset threshold interval in which the first target parameter is located.

For example, it is assumed that six antennas are arranged in the terminal device, that is, N is 6, and a second preset threshold, a fourth preset threshold, and a fifth preset threshold are set in the terminal device, where the second preset threshold is greater than the first preset threshold, the fourth preset threshold is greater than the second preset threshold, and the fifth preset threshold is greater than the fourth preset threshold. Therefore, signal quality parameters of downlink signals received by the six antennas are ranked in descending order. When the first target parameter is greater than or equal to the first preset threshold, four top-ranked antennas are selected from the six antennas as first target antennas if the first target parameter is further less than the second preset threshold; three top-ranked antennas are selected from the six antennas as first target antennas if the first target parameter is greater than or equal to the second preset threshold and less than the fourth preset threshold; two top-ranked antennas are selected from the six antennas as first target antennas if the first target parameter is greater than or equal to the fourth preset threshold and less than the fifth preset threshold; or one top-ranked antenna is selected from the six antennas as a first target antenna if the first target parameter is greater than or equal to the fifth preset threshold.

Step 411. The terminal device uses all the N antennas as first target antennas if the first target parameter is less than the first preset threshold, to continue to receive, through the first target antennas, the downlink signals sent by the network device.

If the processor determines that the first target parameter is less than the first preset threshold, it indicates that signal quality of the downlink signals received by the N antennas is not good. To improve the receiving performance of the terminal device, the processor may use all the N antennas as first target antennas, to continue to receive, through the first target antennas, downlink signals sent by the network device.

Based on the above, in this embodiment of this application, when camping on the network and entering the idle state, the terminal device controls the N antennas to receive the downlink signals sent by the network device, and selects some antennas with better signal quality from the N antennas as first target antennas, to continue to receive, through the first target antennas, the downlink signals sent by the network device. Even if the holding of the user for the terminal device affects signal quality of some antennas, some antennas with better signal quality may be selected from all the antennas as the first target antennas to receive the downlink signals in this embodiment of this application, and the some antennas with better signal quality may be actually antennas that are affected less by the holding of the user. Therefore, signal quality of the downlink signals received by the first target antennas is better, thereby improving signal quality of the downlink signals finally received by the terminal device, to improve receiving performance of the terminal device. In addition, because some antennas of the N antennas are used as the first target antennas, to continue to receive the downlink signals sent by the network device, power consumption of the terminal device can be reduced.

It may be seen that, in the embodiment shown in FIG. 4, when the terminal device is in the idle state, the terminal device determines the second target parameter according to the signal quality parameters corresponding to the downlink signals received by the M second target antennas, and determines whether the second target parameter is less than or equal to the third preset threshold. The terminal device controls, when the second target parameter is less than or equal to the third preset threshold, the N antennas to receive the downlink signals sent by the network device.

In some other embodiments, when the terminal device is in the idle state, the terminal device may receive, based on the M connected second target antennas, the downlink signals sent by the network device. If the terminal device unsuccessfully demodulates the downlink signal received by the M second target antennas, it indicates that signal quality of the downlink signals received through the second target antennas is not good. If the second target antennas are still used to continue to receive the downlink signals sent by the network device, a paging abnormality may occur. Therefore, the terminal device directly controls the N antennas to receive the downlink signals sent by the network device.

Figure 5:
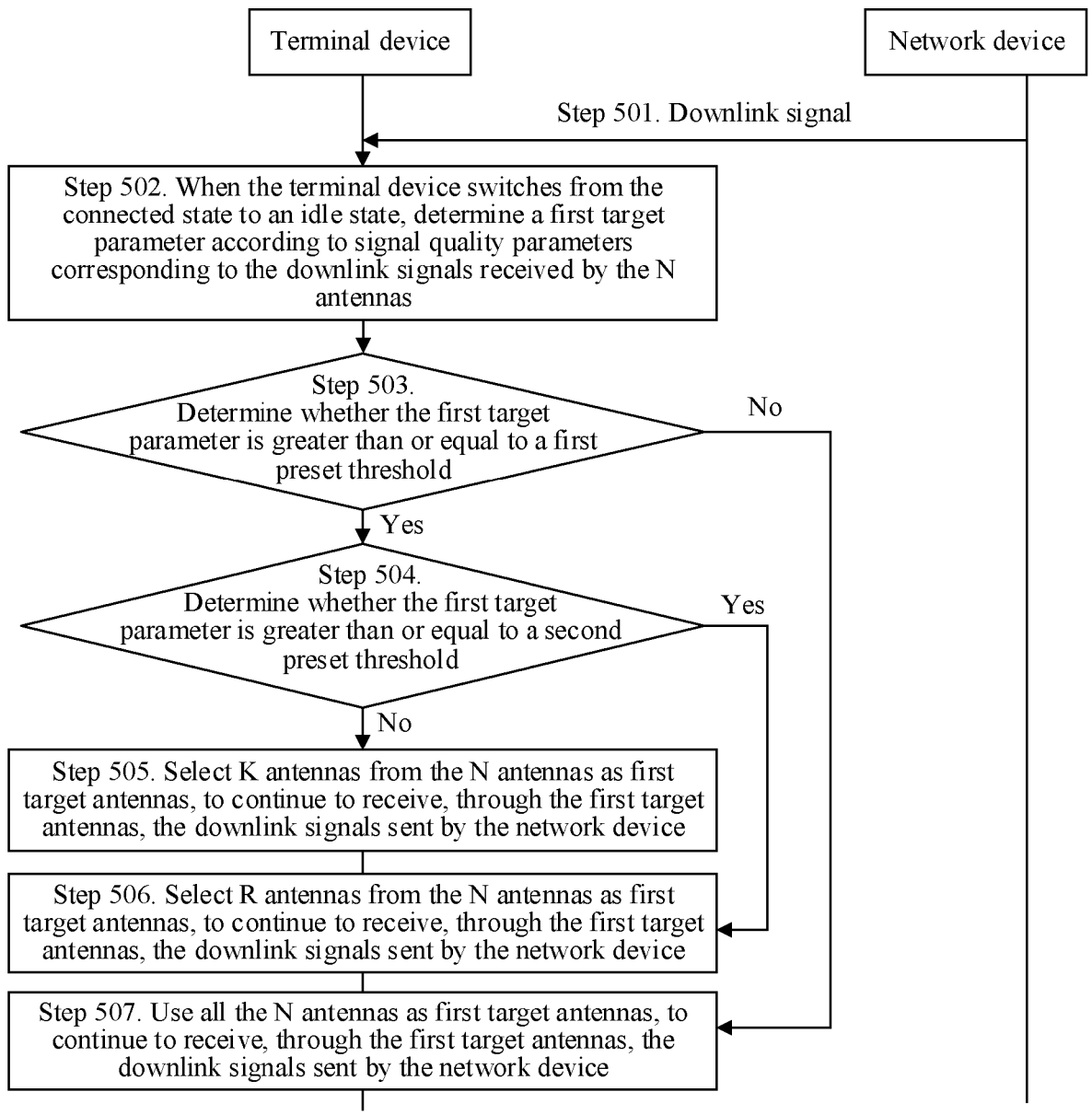
FIG. 5 is a flowchart of an antenna switching method in another scenario according to an embodiment of this application.

For example, FIG. 5 is a flowchart of an antenna switching method in another scenario according to an embodiment of this application. As shown in FIG. 5, the antenna switching method may specifically include the following steps.

Step 501. When a terminal device is in a connected state, the terminal device receives, based on N antennas, downlink signals sent by a network device.

When the terminal device is in an idle state, if it is necessary to execute a corresponding communication service with the network device, the terminal device may send an RRC connection request to the network device, to request the network device to allocate an uplink radio resource to the terminal device, thereby entering an RRC connected state. When the terminal device is in the connected state, the terminal device may execute a corresponding communication service with the network device.

When the terminal device is in the connected state, the terminal device sends an uplink signal to the network device, and the network device also sends a downlink signal to the terminal device. Usually, to improve communication quality of the communication service, N antennas in the terminal device may be used to receive downlink signals sent by the network device.

Step 502. When the terminal device switches from the connected state to an idle state, the terminal device determines a first target parameter according to signal quality parameters corresponding to the downlink signals received by the N antennas.

When the terminal device executes and completes the corresponding communication service with the network device, the terminal device may switch from the connected state to the idle state. The terminal device in the connected state has obtained the downlink signals received by the N antennas in the terminal device. Therefore, when switching from the connected state to the idle state, the terminal device may not need to again control the N antennas to receive the downlink signals sent by the network device.

Therefore, the terminal device may determine the first target parameter according to the signal quality parameters corresponding to the downlink signals received by the N antennas when the terminal device is in the connected state.

It may be understood that the downlink signals received by the N antennas in step 502 may refer to last downlink signals received through the N antennas before the terminal device switches to the idle state.

Step 503. The terminal device determines whether the first target parameter is greater than or equal to a first preset threshold.

Step 504. The terminal device determines whether the first target parameter is greater than or equal to a second preset threshold if the first target parameter is greater than or equal to the first preset threshold.

Step 505. The terminal device selects K antennas from the N antennas as first target antennas if the first target parameter is less than the second preset threshold, to continue to receive, through the first target antennas, the downlink signals sent by the network device.

Step 506. The terminal device selects R antennas from the N antennas as first target antennas if the first target parameter is greater than or equal to the second preset threshold, to continue to receive, through the first target antennas, the downlink signals sent by the network device.

Step 507. The terminal device uses all the N antennas as first target antennas if the first target parameter is less than the first preset threshold, to continue to receive, through the first target antennas, the downlink signals sent by the network device.

A specific implementation of step 503 to step 507 is similar to that of step 407 to step 411. To avoid repetition, details are not described again herein.

Therefore, in this embodiment of this application, when switching from the connected state to the idle state, the terminal device may select, according to the downlink signals sent by the network device and received by the N antennas in the connected state, some antennas with better signal quality from the N antennas as first target antennas, to continue to receive, through the first target antennas, the downlink signals sent by the network device, thereby improving signal quality of the downlink signals finally received by the terminal device, to improve receiving performance of the terminal device.

Figure 6A:
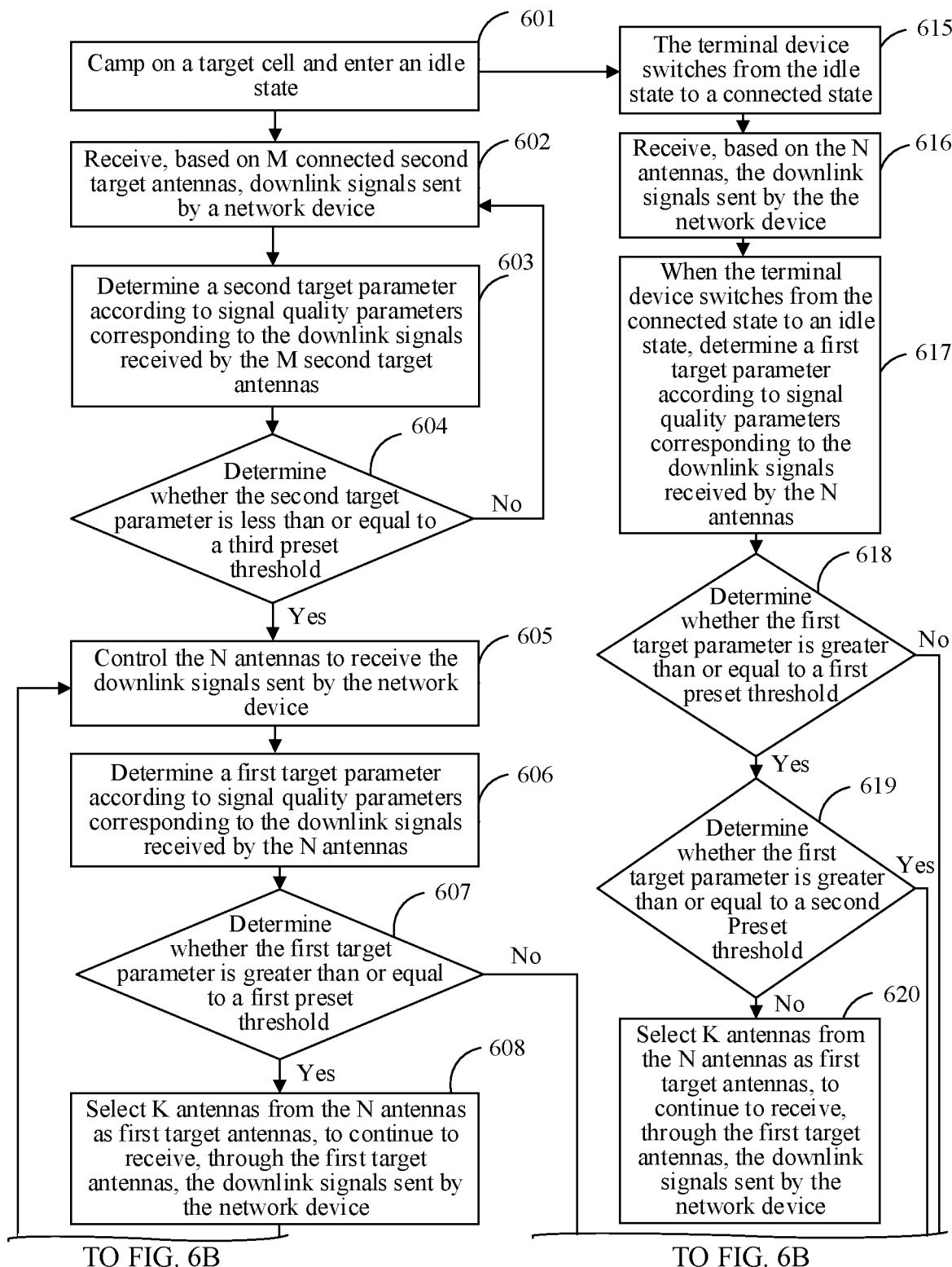
FIG. 6A and FIG. 6B are a schematic flowchart of an antenna switching method according to an embodiment of this application.
Figure 6B:
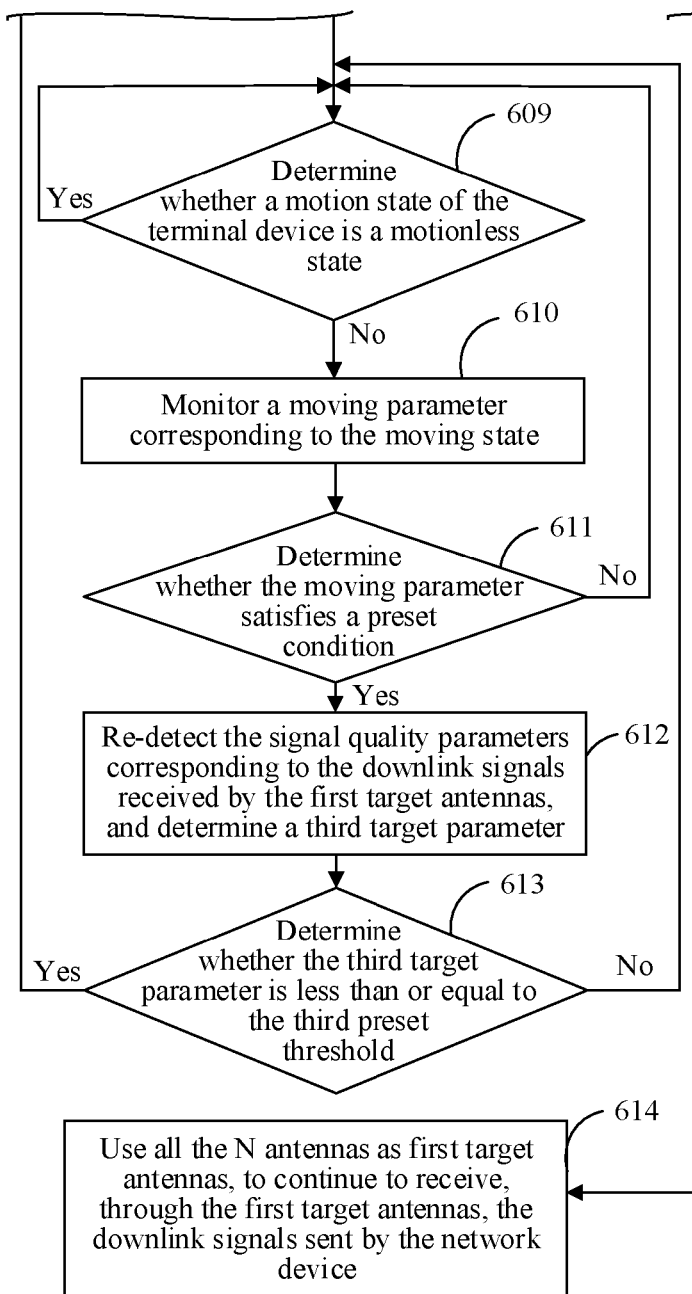

Based on the above, to better clearly reflect selection manners of the first target antenna in two idle state scenarios in this embodiment of this application, the selection manners of the first target antenna in the two idle state scenarios may be described with reference to a schematic flowchart of an antenna switching method shown in FIG. 6A and FIG. 6B. FIG. 6A and FIG. 6B are a schematic flowchart of an antenna switching method according to an embodiment of this application, which may specifically include the following steps:

Step 601. A terminal device camps on a target cell and enters an idle state.

Step 602. The terminal device receives, based on M connected second target antennas, downlink signals sent by a network device.

Step 603. The terminal device determines a second target parameter according to signal quality parameters corresponding to the downlink signals received by the M second target antennas.

Step 604. The terminal device determines whether the second target parameter is less than or equal to a third preset threshold.

Step 605. The terminal device controls, if the second target parameter is less than or equal to a third preset threshold, the N antennas to receive the downlink signals sent by the network device.

Step 606. The terminal device determines a first target parameter according to signal quality parameters corresponding to the downlink signals received by the N antennas.

Step 607. The terminal device determines whether the first target parameter is greater than or equal to a first preset threshold.

A specific implementation of step 601 to step 607 is similar to that of step 401 to step 407. To avoid repetition, details are not described again herein.

Step 608. Select K antennas from the N antennas as first target antennas if the first target parameter is greater than or equal to the first preset threshold, to continue to receive, through the first target antennas, the downlink signals sent by the network device.

Step 609. Determine whether a motion state of the terminal device is a motionless state.

In an optional implementation, after the terminal device determines the first target antennas in the foregoing manner, the terminal device may periodically detect a motion state of the terminal device, and determine whether the motion state of the terminal device is a motionless state.

The motion state of the terminal device includes a motionless state or a moving state. The motionless state may be understood as a state in which a position of the terminal device relative to a reference object does not change or changes little (that is, changes slightly) in a preset time segment. The moving state may be understood as a state in which a position of the terminal device relative to a reference object changes greatly in a preset time segment.

In some embodiments, the terminal device may monitor, through a sensor capable of sensing a motion state, whether a motion state of the terminal device is in the motionless state or the moving state. For example, the foregoing sensor for sensing a motion state may be an acceleration sensor, and a motion state of the terminal device is determined based on accelerations in a direction X, a direction Y, and a direction Z monitored by the acceleration sensor. When the accelerations in the direction X, the direction Y, and the direction Z monitored by the acceleration sensor are all 0 in a specific duration or are in a preset threshold range, it is determined that the terminal device is in the motionless state; and when accelerations in any one or more directions monitored by the acceleration sensor are out of the preset threshold range, it is determined that the terminal device is in the moving state.

When the processor determines that the terminal device is in the motionless state, it indicates that quality of downlink signals received by antennas in the terminal device in a specific time segment does not change substantially. Therefore, the terminal device still uses the first target antennas with good signal quality selected in the foregoing steps to continue to receive the downlink signals sent by the network device, and continues to monitor the motion state of the terminal device.

For example, the terminal device is placed by the user on a motionless office desk in a specific time segment. In this case, the accelerations in the direction X, the direction Y, and the direction Z monitored by the acceleration sensor are all 0 in a specific duration, that is, it is determined that the terminal device is in the motionless state. Then, the first target antennas previously determined continue to be used to receive the downlink signals sent by the network device.

Step 610. The terminal device monitors a moving parameter corresponding to the moving state when the terminal device is in the moving state.

When the processor determines that the terminal device is in the moving state, the terminal device may monitor the moving parameter corresponding to the moving state. The moving parameter includes a moving duration and/or a moving distance.

Specifically, the moving distance may be measured in the following manner: Once the terminal device monitors that the terminal device is in the moving state, the terminal device obtains a first distance between the terminal device and a first base station and a second distance between the terminal device and a second base station respectively; after the terminal device is in the moving state for a specific duration, the terminal device obtains a third distance between the terminal device and the first base station and a fourth distance between the terminal device and the second base station respectively; and finally the terminal device may determine the moving distance of the terminal device based on a fifth distance between the first base station and the second base station, the first distance, the second distance, the second distance, and the fourth distance.

The terminal device may obtain the first distance between the terminal device and the first base station in the following manner: First, calculation is performed according to a path loss or a timing advance (timing advance, TA) between the first base station and the terminal device, to obtain a planar distance between the terminal device and the first base station; and then, calculation is performed according to the planar distance between the terminal device and the first base station and an altitude of an antenna of the first base station, to obtain the first distance between the terminal device and the first base station.

The altitude of the antenna of the first base station refers to a distance between the top of the antenna of the first base station and the bottom of the first base station. The path loss between the first base station and the terminal device refers to an amount of a downlink signal sent from the first base station that attenuates when the downlink signal reaches the terminal device when the terminal device communicates with the first base station. The timing advance between the first base station and the terminal device may be set by the first base station, and is used to offset a delay of signal transmission between the terminal device and the first base station.

It should be noted that, the path loss or timing advance between the first base station and the terminal device obtained by the terminal device, and the altitude of the antenna of the first base station may be returned by the first base station according to an obtaining request after the terminal device sends the obtaining request to the first base station, or may be carried in a downlink signal sent by the first base station to the terminal device when the first base station communicates with the terminal device. A specific implementation may be set according to an actual situation, and is not limited in this embodiment of this application.

A manner in which the terminal device obtains the second distance between the terminal device and the second base station, and a manner in which the terminal device obtains the third distance between the terminal device and the first base station and the fourth distance between the terminal device and the second base station after a specific duration are similar to the foregoing manner of obtaining the first distance between the terminal device and the first base station. To avoid repetition, details are not described again herein.

After the terminal device obtains the fifth distance between the first base station and the second base station, the first distance, the second distance, the second distance, and the fourth distance, the moving distance of the terminal device may be calculated using plane geometry. The performing calculation using plane geometry includes performing calculation using plane geometry theorems such as the law of cosines and the Pythagorean theorem, which are not listed one by one in this embodiment of this application.

The moving duration may be autonomously measured by the terminal device. For example, a time difference between a moment at which the acceleration sensor in the terminal device starts to monitor that the terminal device is in the moving state and a current moment may be determined as the moving duration; or a moving speed of the terminal device may be obtained, and a ratio of the foregoing calculated moving distance to the moving speed is determined as the moving duration.

Step 611. The terminal device determines whether the moving parameter satisfies a preset condition.

The preset condition includes that the moving duration is greater than a preset duration and/or the moving distance is greater than a preset distance. The preset duration and the preset distance may be preset according to empirical values. For example, the preset duration is one minute, and the preset distance is 100 m.

First situation: The moving parameter includes the moving duration. When the moving duration is greater than the preset duration, it is determined that the moving parameter satisfies the preset condition; and when the moving duration is less than or equal to the preset duration, it is determined that the moving parameter does not satisfy the preset condition.

Second situation: The moving parameter includes the moving distance. When the moving distance is greater than the preset distance, it is determined that the moving parameter satisfies the preset condition; and when the moving distance is less than or equal to the preset distance, it is determined that the moving parameter does not satisfy the preset condition.

Third situation: The moving parameter includes the moving duration and the moving distance. When the moving duration is greater than the preset duration and the moving distance is greater than the preset distance, it is determined that the moving parameter satisfies the preset condition. When the moving duration is less than or equal to the preset duration and/or the moving distance is less than or equal to the preset distance, it is determined that the moving parameter does not satisfy the preset condition.

It should be noted that, when the terminal device is in the moving state, but the moving parameter does not satisfy the preset condition, the terminal device can still continue to receive, based on the first target antennas, the downlink signals sent by the network device, and continue to monitor the motion state of the terminal device.

Step 612. The terminal device re-detects, when the moving parameter satisfies the preset condition, the signal quality parameters corresponding to the downlink signals received by the first target antennas, and determines a third target parameter according to the re-detected signal quality parameters corresponding to the first target antennas.

When the terminal device is in the moving state, the signal quality of the downlink signals received by the first target antennas selected from the N antennas changes as the terminal device moves. Therefore, the terminal device re-detects, when the moving parameter satisfies the preset condition, the signal quality parameters of the downlink signals received by the first target antennas selected from the N antennas, and calculates a weighted average value or a maximum value of the signal quality parameters according to the re-detected signal quality parameters corresponding to the first target antennas, to obtain the third target parameter.

Step 613. The terminal device determines whether the third target parameter is less than or equal to the third preset threshold.

The terminal device compares the calculated third target parameter with the third preset threshold. When the third target parameter is less than or equal to the third preset threshold, it indicates that the quality of the downlink signals received by the first target antennas deteriorates, and the foregoing step 605 and subsequent steps are executed again; and when the third target parameter is greater than the third preset threshold, it indicates that the quality of the downlink signals received by the first target antennas is good, and then the terminal device still uses the first target antennas with good signal quality selected in the foregoing step 608 to continue to receive the downlink signals sent by the network device, and continues to monitor the motion state of the terminal device.

Step 614. The terminal device uses all the N antennas as first target antennas if the first target parameter is less than the first preset threshold, to continue to receive, through the first target antennas, the downlink signals sent by the network device.

A specific implementation of step 614 is similar to that of step 411. To avoid repetition, details are not described again herein.

Step 615. The terminal device switches from the idle state to a connected state.

Step 616. The terminal device receives, based on the N antennas, the downlink signals sent by the network device.

Step 617. When the terminal device switches from the connected state to the idle state, the terminal device determines a first target parameter according to signal quality parameters corresponding to downlink signals received by N antennas in the connected state.

Step 618. The terminal device determines whether the first target parameter is greater than or equal to a first preset threshold.

Step 619. The terminal device determines whether the first target parameter is greater than or equal to a second preset threshold if the first target parameter is greater than or equal to the first preset threshold.

Step 620. The terminal device selects K antennas from the N antennas as first target antennas if the first target parameter is less than the second preset threshold, to continue to receive, through the first target antennas, the downlink signals sent by the network device.

Step 621. The terminal device selects R antennas from the N antennas as first target antennas if the first target parameter is greater than or equal to the second preset threshold, to continue to receive, through the first target antennas, the downlink signals sent by the network device.

Step 622. The terminal device uses all the N antennas as first target antennas if the first target parameter is less than the first preset threshold, to continue to receive, through the first target antennas, the downlink signals sent by the network device.

For a specific implementation of step 615 to step 622, reference may be made to descriptions of corresponding steps in FIG. 5. To avoid repetition, details are not described again herein.

Therefore, in this embodiment of this application, after the first target antennas are determined from the N antennas, whether the motion state of the terminal device is the motionless state may be detected. When being in the motionless state, the terminal device may directly use the previously selected first target antennas to continue to receive the downlink signals, thereby reducing power consumption caused by continuously switching the target antennas for receiving the downlink signals. When the terminal device is in the moving state, and the moving parameter the terminal device satisfies the preset condition, the first target antennas for receiving the downlink signals are selected from the N antennas again, thereby improving the receiving performance of the terminal device in the moving state.

In some embodiments, when the terminal device enters the idle state, after the first target antennas are selected from the N antennas in the foregoing manner, the signal quality parameters of the downlink signals received by the selected first target antennas may be periodically detected, to determine whether to switch the antennas for receiving the downlink signals. For example, the terminal device may execute the foregoing step 612 and subsequent steps every specific detection period.

In a possible manner, the detection period may be manually set. For example, the detection period is two minutes. Signal quality parameters of downlink signals received by the first target antennas are detected once every two minutes, and whether a maximum value or a weighted average value of the signal quality parameters is less than or equal to the third preset threshold is determined. When the maximum value or the weighted average value is less than or equal to the third preset threshold, the foregoing step 605 and subsequent steps are executed; and when the maximum value or the weighted average value is greater than the third preset threshold, the first target antennas are still used to continue to receive the downlink signals sent by the network device.

In another possible manner, the detection period may alternatively be dynamically regulated according to the motion state of the terminal device, and the motion state of the terminal device may be the motionless state or the moving state. When the motion state of the terminal device is the motionless state, signal quality parameters of downlink signals received by the first target antennas are detected once every first detection period, and whether a maximum value or a weighted average value of the signal quality parameters is less than or equal to the third preset threshold is determined. When the motion state of the terminal device is the moving state, it may not be necessary to trigger the re-detection process by determining whether the moving parameter of the terminal device satisfies the preset condition. Instead, signal quality parameters of downlink signals received by the first target antennas may be detected once every second detection period, and whether a maximum value or a weighted average value of the signal quality parameters is less than or equal to the third preset threshold is determined. The first detection period is greater than the second detection period.

Further, when the motion state of the terminal device is the moving state, the detection period may alternatively be dynamically regulated according to the moving speed of the terminal device. The moving speed is negatively correlated with the detection period. To be specific, when the moving speed of the terminal device is larger, the detection period is shorter; and when the moving speed of the terminal device is smaller, the detection period is longer.

For example, a correspondence between moving speed intervals and detection periods may be preset. When a target moving speed of the mobile terminal is detected, the correspondence between moving speed intervals and detection periods may be searched for a target detection period corresponding to a moving speed interval in which the target moving speed is located. In addition, signal quality parameters of downlink signals received by the first target antennas are detected once every target detection period, and whether a maximum value or a weighted average value of the signal quality parameters is less than or equal to the third preset threshold is determined.

Certainly, it may be understood that the foregoing preset thresholds (for example, the first preset threshold, the second preset threshold, and the third preset threshold) may alternatively be dynamically adjusted according to the motion state of the terminal device. A preset threshold corresponding to a case that the terminal device is in the motionless state is less than a preset threshold corresponding to a case that the terminal device is in the moving state. Further, the moving speed of the terminal device is positively correlated with the preset threshold. To be specific, when the moving speed of the terminal device is larger, the preset threshold corresponding to the moving speed is larger; and when the moving speed of the terminal device is smaller, the preset threshold corresponding to the moving speed is smaller.

Specifically, a correspondence between moving speed intervals and preset thresholds (for example, the first preset threshold, the second preset threshold, and the third preset threshold) may be preset. When a target moving speed of the mobile terminal is detected, the correspondence between moving speed intervals and preset thresholds may be searched for a preset threshold (for example, the one preset threshold, the second preset threshold, and the third preset threshold) corresponding to a moving speed interval in which the target moving speed is located.

For example, when the third preset threshold corresponding to the moving speed interval in which the target moving speed is located is found from the correspondence between moving speed intervals and preset thresholds, the found third preset threshold is compared with the second target parameter to execute the foregoing step 604, or the found third preset threshold is compared with the third target parameter to execute the foregoing step 613.

It may be understood that the signal quality parameter in this embodiment of this application may be any one of the following several parameters: a signal to interference plus noise ratio (signal to interference plus noise ratio, SINR), a reference signal received power (reference signal receiving power, RSRP), a reference signal received quality (reference signal receiving quality, RSRQ), a received signal strength indication (received signal strength indication, RSSI), or the like, and is not limited in this embodiment of this application.

The RSRP is one parameter that can reflect a communication state of the terminal device. When communicating with the network device, the terminal device may perform measurement to obtain the RSRP. The RSRP is used to measure a received signal strength of the terminal device, whose unit is dBm. A larger RSRP indicates better communication quality of the terminal device. A smaller RSRP indicates worse communication quality of the terminal device.

In addition, in this embodiment of this application, some antennas may alternatively be selected from the N antennas, to send uplink signals to the network device. Descriptions are performed below using an example in which the quantity N of antennas in the terminal device is 4.

First situation: The terminal device uses four antennas to receive downlink signals sent by the terminal device, and the terminal device supports only one antenna in transmitting an uplink signal. Therefore, for a time division duplexing (time division duplexing, TDD) frequency band, one antenna with best signal quality may be selected from the four antennas as a transmission antenna, to transmit an uplink signal to the network device.

Second situation: The terminal device uses four antennas to receive downlink signals sent by the terminal device, and the terminal device supports only one antenna in transmitting an uplink signal. Therefore, for a TDD frequency band or a frequency division duplexing (frequency division duplexing, FDD) frequency band, one antenna with best signal quality may alternatively be cyclically switched in the four antennas as a transmission antenna, to transmit an uplink signal to the network device.

Third situation: The terminal device uses two antennas to receive downlink signals sent by the terminal device, and the terminal device can support two antennas in transmitting uplink signals. Therefore, for a TDD frequency band, one antenna with best signal quality may be selected from the two antennas as a transmission antenna, to transmit an uplink signal to the network device; and for an FDD frequency band, one antenna may be cyclically switched in the two antennas as a transmission antenna, to transmit an uplink signal to the network device.

Fourth situation: The terminal device uses four antennas to receive downlink signals sent by the terminal device, and the terminal device can support two antennas in transmitting uplink signals. Therefore, if the terminal device uses two antennas to transmit uplink signals, one antenna with best signal quality may be selected from the first antenna and the first antenna as a transmission antenna, and one antenna with best signal quality may be selected from the third antenna and the fourth antenna as a transmission antenna, to transmit uplink signals to the network device through the two transmission antennas; and if the terminal device uses one antenna to transmit an uplink signal, one antenna with best signal quality may be selected from the four antennas as a transmission antenna, to transmit an uplink signal to the network device.

Figure 7:
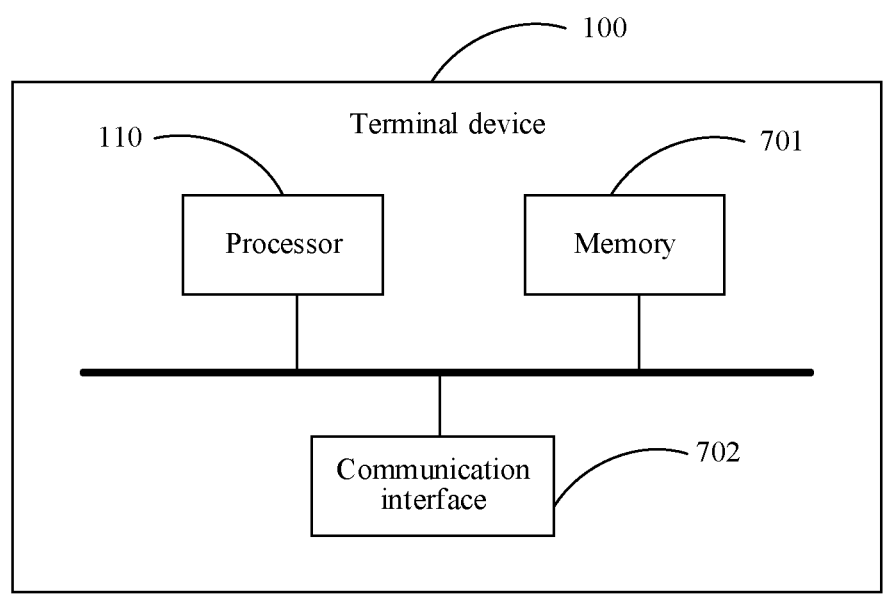
FIG. 7 is a schematic structural diagram of a terminal device according to an embodiment of this application.

FIG. 7 is a schematic diagram of a hardware structure of a terminal device according to an embodiment of this application. The terminal device 100 shown in FIG. 7 includes: a memory 701, a processor 110, and a communication interface 702. The memory 701, the processor 110, and the communication interface 702 may communicate with each other. For example, the memory 701, the processor 110, and the communication interface 702 may communicate with each other through a communication bus.

The memory 701 may be a read-only memory (read-only memory, ROM), a static storage device, a dynamic storage device, or a random access memory (random access memory, RAM). The memory 701 may store a computer program, the processor 110 controls execution of the computer program, and communication interface 702 performs communication, to implement the antenna switching method provided in the foregoing embodiments of this application.

An embodiment of this application further provides a computer-readable storage medium. The method described in the foregoing embodiments may be fully or partially implemented by software, hardware, firmware, or any combination thereof. If implemented in software, the functions may be stored on or transmitted over a computer-readable medium as one or more instructions or code. The computer-readable medium may include a computer storage medium and a communication medium, and may also include any medium that enables a computer program to be transmitted from one place to another. The storage medium may be any target medium accessible by a computer.

In a possible implementation, the computer-readable medium may include a RAM, a ROM, a compact disc read-only memory (compact disc read-only memory, CD-ROM) or another optical disk memory, a magnetic disk memory or another magnetic storage device, or any other medium that is used to carry or store required program code in a form of instructions or a data structure and that can be accessed by a computer. In addition, any connection is appropriately referred to as a computer-readable medium. For example, if software is transmitted from a website, a server or another remote source by using a coaxial cable, an optical fiber cable, a twisted pair, a digital subscriber line (Digital Subscriber Line, DSL) or wireless technologies such as infrared ray, radio and microwave, the coaxial cable, optical fiber cable, twisted pair, DSL or wireless technologies such as infrared ray, radio and microwave are included in fixation of a medium to which they belong. For example, a disk and a disc used by this application include a compact disc, a laser disc, an optical disc, a digital versatile disc (digital versatile disc, DVD), a floppy disk, and a Blu-ray disc. The disk generally magnetically reproduces data, and the disc optically reproduces data by using laser. The foregoing combination should also be included in the scope of the computer-readable medium.

Embodiments of this application are described with reference to the flowcharts and/or block diagrams of the method, the device (system), and the computer program product according to embodiments of this application. It may be understood that, computer program instructions can implement each procedure and/or block in the flowcharts and/or block diagrams, and a combination of procedures and/or blocks in the flowcharts and/or block diagrams. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus for implementing a specific function in one or more processes in the flowcharts and/or in one or more blocks in the block diagrams.

The objectives, technical solutions, and benefits of this application are further described in detail in the above specific implementations. It should be understood that the above descriptions are merely specific implementations of this application, and are not intended to limit the protection scope of this application. Any modification, equivalent replacement, or improvement made based on the technical solutions in this application falls within the protection scope of this application.

The invention claimed is:

1. A method, comprising:
    selecting some antennas from a first quantity of antennas of a terminal device as first target antennas if a first target parameter is greater than or equal to a first preset threshold,
    wherein the first quantity is a positive integer greater than 1,
    wherein the terminal device is in an idle state,
    wherein the first target parameter is based on signal quality parameters corresponding to downlink signals received by the first quantity of antennas,
    wherein the first target antennas are configured to continue to receive downlink signals from a network device, and
    wherein signal quality parameters of the downlink signals received by the first target antennas are greater than signal quality parameters of downlink signals received by other antennas different from the first target antennas in the first quantity of antennas.

2. The method of claim 1, wherein the first target parameter is a first feature value of the signal quality parameters corresponding to the downlink signals received by the first quantity of antennas, and wherein the first feature value is a weighted average value or a maximum value of the signal quality parameters corresponding to the first quantity of antennas.

3. The method of claim 1, wherein selecting some antennas from the first quantity of antennas as first target antennas comprises:
    comparing the first target parameter with a second preset threshold if the first target parameter is greater than or equal to the first preset threshold, wherein the first preset threshold is less than the second preset threshold; and either a) selecting a second quantity of antennas from the first quantity of antennas as first target antennas if the first target parameter is less than the second preset threshold and greater than or equal to the first preset threshold; or b) selecting a third quantity of antennas from the first quantity of antennas as first target antennas if the first target parameter is greater than or equal to the second preset threshold, wherein the second quantity and the third quantity are both positive integers less than the first quantity, and the second quantity is greater than the third quantity.

4. The method of claim 1, further comprising using all of the first quantity of antennas as first target antennas if the first target parameter is less than the first preset threshold.

5. The method of claim 1, further comprising:
receiving, through a fourth quantity of second target antennas connected in the idle state, the downlink signals from the network device, wherein the fourth quantity is a positive integer less than the first quantity; and
controlling, if a second target parameter is less than or equal to a third preset threshold, the first quantity of antennas to receive the downlink signals from the network device, wherein the third preset threshold is greater than the first preset threshold, and wherein the second target parameter is based on signal quality parameters corresponding to the downlink signals received by the fourth quantity of second target antennas.

6. The method of claim 5, wherein the second target parameter is a second feature value of the signal quality parameters corresponding to the downlink signals received by the fourth quantity of second target antennas, and wherein the second feature value is a weighted average value or a maximum value of the signal quality parameters corresponding to the fourth quantity of second target antennas.

7. The method of claim 1, further comprising:
receiving, through a fourth quantity of second target antennas connected in the idle state, the downlink signals from the network device, wherein the fourth quantity is a positive integer less than the first quantity; and
controlling, if the downlink signals received by the fourth quantity of second target antennas are demodulated unsuccessfully, the first quantity of antennas to receive the downlink signals from the network device.

8. The method of claim 1, wherein before the first target parameter is determined, the method further comprises:
switching, by the terminal device, from the idle state to a connected state;
receiving, in the connected state through the first quantity of antennas, the downlink signals from the network device; and
switching, by the terminal device, from the connected state to the idle state.

9. The method of claim 1, wherein after selecting some antennas from the first quantity of antennas as first target antennas, the method further comprises:
monitoring a motion state of the terminal device, wherein the motion state comprises a motionless state or a moving state; and
continuing to receive, through the first target antennas when the motion state is the motionless state, the downlink signals from the network device.

10. The method of claim 9, wherein after monitoring the motion state of the terminal device, the method further comprises:
monitoring a moving parameter corresponding to the moving state when the motion state is the moving state; and
re-detecting, when the moving parameter satisfies a preset condition, the signal quality parameters of the downlink signals received by the first target antennas, wherein whether to switch the antennas for receiving the downlink signals is based on the re-detected signal quality parameters corresponding to the first target antennas.

11. A terminal device, comprising:
a first quantity of antennas, wherein the first quantity is a positive integer greater than 1;
one or more processors; and
a memory coupled to the one or more processors and configured to store instructions that, when executed by the one or more processors, cause the terminal device to be configured to:
select some antennas from the first quantity of antennas as first target antennas if a first target parameter is greater than or equal to a first preset threshold,
wherein the first target parameter is based on signal quality parameters corresponding to downlink signals received by the first quantity of antennas,
wherein the first target antennas are configured to continue to receive downlink signals from a network device, and
wherein signal quality parameters of the downlink signals received by the first target antennas are greater than signal quality parameters of downlink signals received by other antennas different from the first target antennas in the first quantity of antennas.

12. The terminal device of claim 11, wherein the first target parameter is a first feature value of the signal quality parameters corresponding to the downlink signals received by the first quantity of antennas, and wherein the first feature value is a weighted average value or a maximum value of the signal quality parameters corresponding to the first quantity of antennas.

13. The terminal device of claim 11, wherein selecting some antennas from the first quantity of antennas as first target antennas comprises:
comparing the first target parameter with a second preset threshold if the first target parameter is greater than or equal to the first preset threshold, wherein the first preset threshold is less than the second preset threshold; and
either a) selecting a second quantity of antennas from the first quantity of antennas as first target antennas if the first target parameter is less than the second preset threshold and greater than or equal to the first preset threshold; or
b) selecting a third quantity of antennas from the first quantity of antennas as first target antennas if the first target parameter is greater than or equal to the second preset threshold, wherein the second quantity and the third quantity are both positive integers less than the first quantity, and the second quantity is greater than the third quantity.

14. The terminal device of claim 11, wherein the instructions, when executed by the one or more processors, further cause the terminal device to use all of the first quantity of antennas as first target antennas if the first target parameter is less than the first preset threshold.

15. The terminal device of claim 11, wherein the instructions, when executed by the one or more processors, further cause the terminal device to:

receive, through a fourth quantity of second target antennas connected in an idle state, the downlink signals from the network device, wherein the fourth quantity is a positive integer less than the first quantity; and control, if a second target parameter is less than or equal to a third preset threshold, the first quantity of antennas to receive the downlink signals from the network device, wherein the third preset threshold is greater than the first preset threshold, and wherein the second target parameter is based on signal quality parameters corresponding to the downlink signals received by the fourth quantity of second target antennas.

16. The terminal device of claim 15, wherein the second target parameter is a second feature value of the signal quality parameters corresponding to the downlink signals received by the fourth quantity of second target antennas, and wherein the second feature value is a weighted average value or a maximum value of the signal quality parameters corresponding to the fourth quantity of second target antennas.

17. The terminal device of claim 11, wherein the instructions, when executed by the one or more processors, further cause the terminal device to:

receive, through a fourth quantity of second target antennas connected in an idle state, the downlink signals from the network device, wherein the fourth quantity is a positive integer less than the first quantity; and control, if the downlink signals received by the fourth quantity of second target antennas are demodulated unsuccessfully, the first quantity of antennas to receive the downlink signals from the network device.

18. The terminal device of claim 11, wherein before the first target parameter is determined, the instructions, when executed by the one or more processors, further cause the terminal device to:

switch from an idle state to a connected state;

receive, in the connected state through the first quantity of antennas, the downlink signals from the network device; and switch from the connected state to the idle state.

19. The terminal device of claim 11, wherein after selecting some antennas from the first quantity of antennas as first target antennas, the instructions, when executed by the one or more processors, further cause the terminal device to:

monitor a motion state of the terminal device, wherein the motion state comprises a motionless state or a moving state; and continue to receive, through the first target antennas when the motion state is the motionless state, the downlink signals from the network device.

20. The terminal device of claim 19, wherein after monitoring the motion state of the terminal device, the instructions, when executed by the one or more processors, further cause the terminal device to:

monitor a moving parameter corresponding to the moving state when the motion state is the moving state; and re-detect, when the moving parameter satisfies a preset condition, the signal quality parameters of the downlink signals received by the first target antennas, wherein whether to switch the antennas for receiving the downlink signals is based on the re-detected signal quality parameters corresponding to the first target antennas.

* * * * *